United States Patent [19]

Rochette

[11] 3,822,729
[45] July 9, 1974

[54] AUTOMATIC BARS

[76] Inventor: Georges Omer Rochette, 7 Eastwood Pl., Apt. 4, Vanier, Ontario, Canada

[22] Filed: Sept. 10, 1971

[21] Appl. No.: 179,278

[30] Foreign Application Priority Data
Sept. 14, 1970 Canada.................................. 93228

[52] U.S. Cl....................... 141/92, 15/304, 15/339, 134/72, 134/115 R, 141/94, 141/98
[51] Int. Cl......... B65b 3/06, B67c 3/24, B67d 5/02
[58] Field of Search............. 141/89, 94, 91, 92, 98; 15/304, 339; 134/72, 115 R

[56] References Cited
UNITED STATES PATENTS

| | | | |
|---|---|---|---|
| 248,917 | 11/1881 | Clark | 141/92 |
| 974,514 | 11/1910 | Patrick | 141/92 |
| 2,602,576 | 7/1952 | Spruck | 141/94 |
| 2,673,017 | 3/1954 | Emmons | 141/91 X |
| 2,740,571 | 4/1956 | Busto | 141/94 |
| 2,879,811 | 3/1959 | Parraga | 141/94 X |
| 3,097,670 | 7/1963 | Berman | 141/83 |
| 3,101,752 | 8/1963 | Martin | 141/92 |
| 3,119,523 | 1/1964 | Jaffe | 141/94 X |
| 3,520,726 | 7/1970 | Gay | 134/115 R |
| 3,622,279 | 11/1971 | Moran | 141/98 X |
| 3,658,073 | 4/1972 | Friedhelm | 134/72 |
| 3,680,567 | 8/1972 | Hansen | 134/115 R |
| 3,683,977 | 8/1972 | Crowe | 141/130 |
| 3,716,083 | 2/1973 | Tuma | 141/91 X |
| 3,716,338 | 2/1973 | Moran | 141/91 X |

*Primary Examiner*—Wayne A. Morse, Jr.
*Attorney, Agent, or Firm*—Stevens, Davis, Miller & Mosher

[57] ABSTRACT

The automatic bar machine is housed in a cabinet having an "empty indicator board", some exit openings to serve the orders on a counter beside an order console. The machine comprises an automatic glass washer, a glass distribution conveyor, some spare trays of glasses, and a glass distributor to provide empty glasses to the exit ejector and mixing stations; the bottled ingredients are carried by the main conveyor from the bottles dispensing station to the order console. A dirty glass conveyor system conveyed the dirty glasses to the automatic glass washer.

3 Claims, 44 Drawing Figures

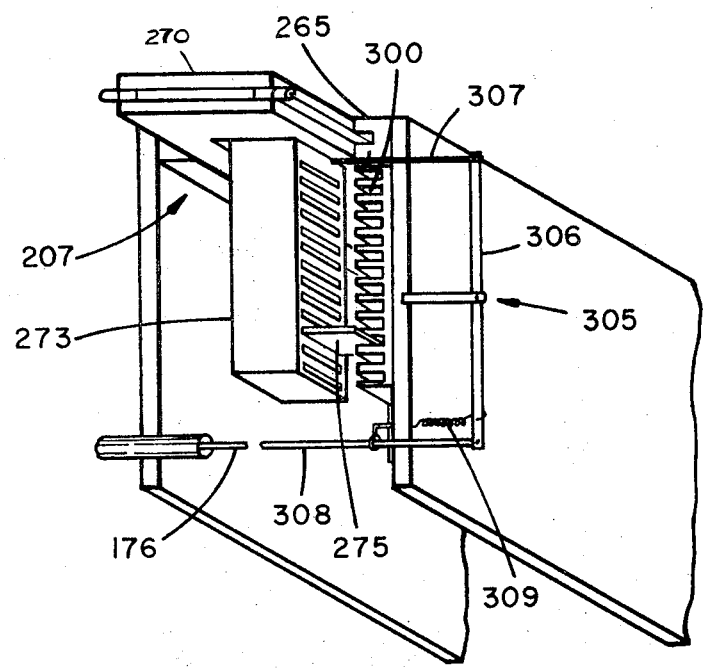
F I G. 29

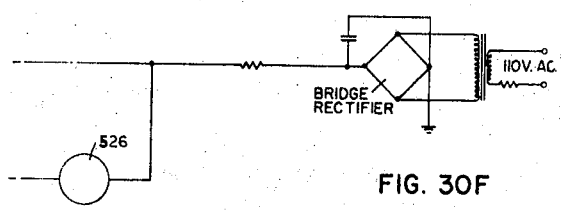
FIG. 30F
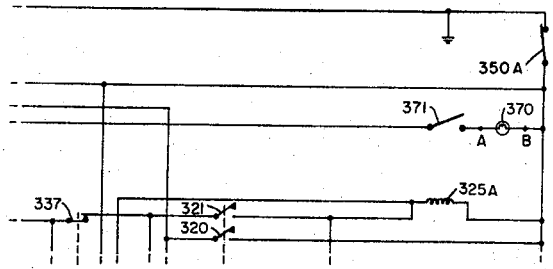

AUTOMATIC BARS

This invention relates to an automatic dispensing, mixing and distributing machine.

Dispensing machines known to date have relatively simple tasks in that the majority of these are for dispensing a liquid drink into a glass usually positioned in a stationary position below the dispensing nozzle. Once the glass is filled it is removed from this position for consumption.

When dealing with dispensing of a great many types of liquids and also mixing of two or more of these, in most cases it is necessary to move the glass or the bottle to different locations to complete the operations. This means that the machine has to be much more complex and the operations must be effected more rapidly.

A feature of the present invention is to provide such an automatic dispenser to perform basically the operations of the bartender, that is to receive an order for a beverage, mix the beverage in the correct quantities with the right liquids and ingredients, serve the drink and also serve bottles of filler or of beer and in most cases feed the glasses to an automatic washing machine and maintain a storage of glasses.

A particular embodiment of the dispensing machine according to the invention will be described further with respect to the drawings, in which:

FIG. 29 is an isometric view of an indicator support reset mechanism associated with a section of the main conveyor and of the sensing channels and FIG. 30 is a scheme of FIGS. 30A through 30H which are, with FIGS. 30I and 30J, schematic views of the electrical circuitry of the particular embodiment of the invention.

Figure 1:
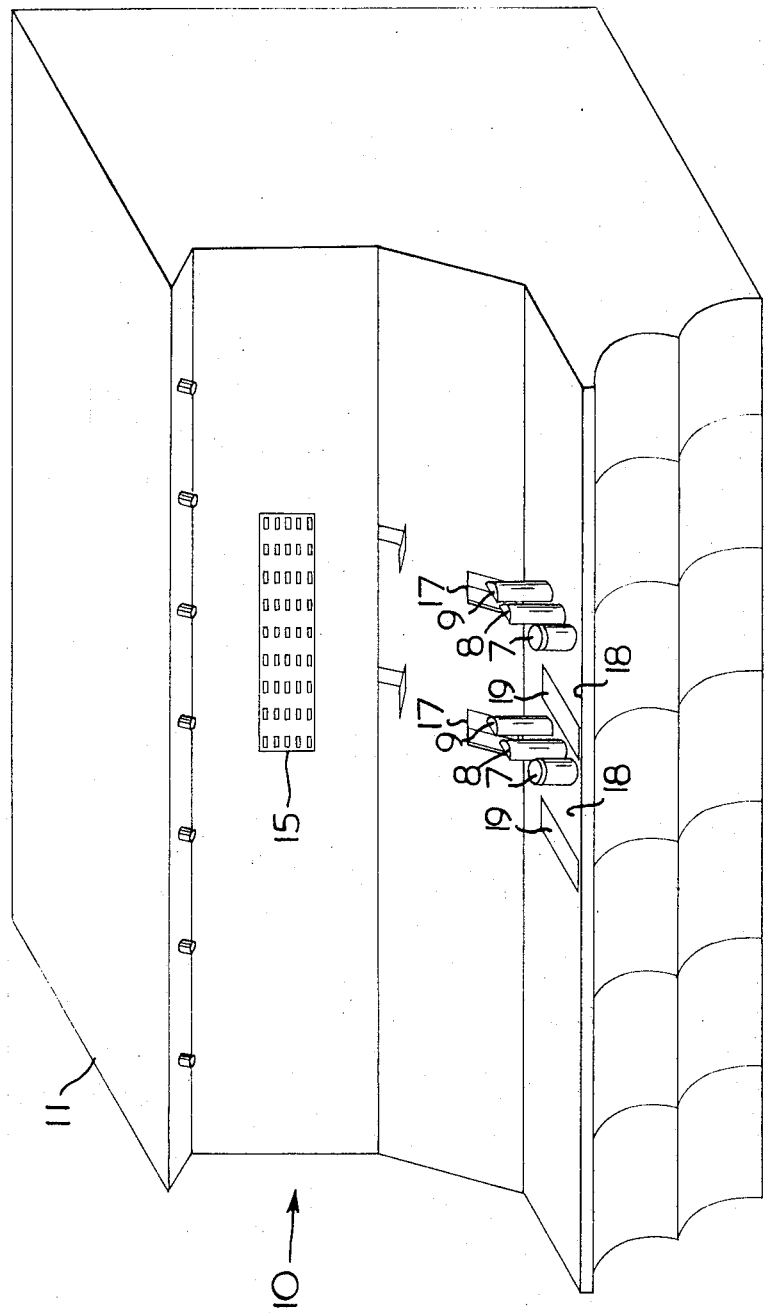
FIG. 1 is an isometric view of the automatic bar dispensing machine.

Referring now to the drawings and more particularly to FIG. 1; there is shown generally at 10 the automatic bar machine. The automatic bar is housed in a cabinet 11 having an "empty indicator board" 15 showing by mean of lettered lights which supply storage is empty, and exit openings 17 to permit the system to serve the desired order which can be a mixed drink, a bottle of beer, or a mixed drink with a bottle of filler, on a counter 18 having an order console 19, a stirrer, blender and shaker machine 9, a bottle opener 8 and a special funnel system 7 to strain the drinks when necessary.

Figure 2:
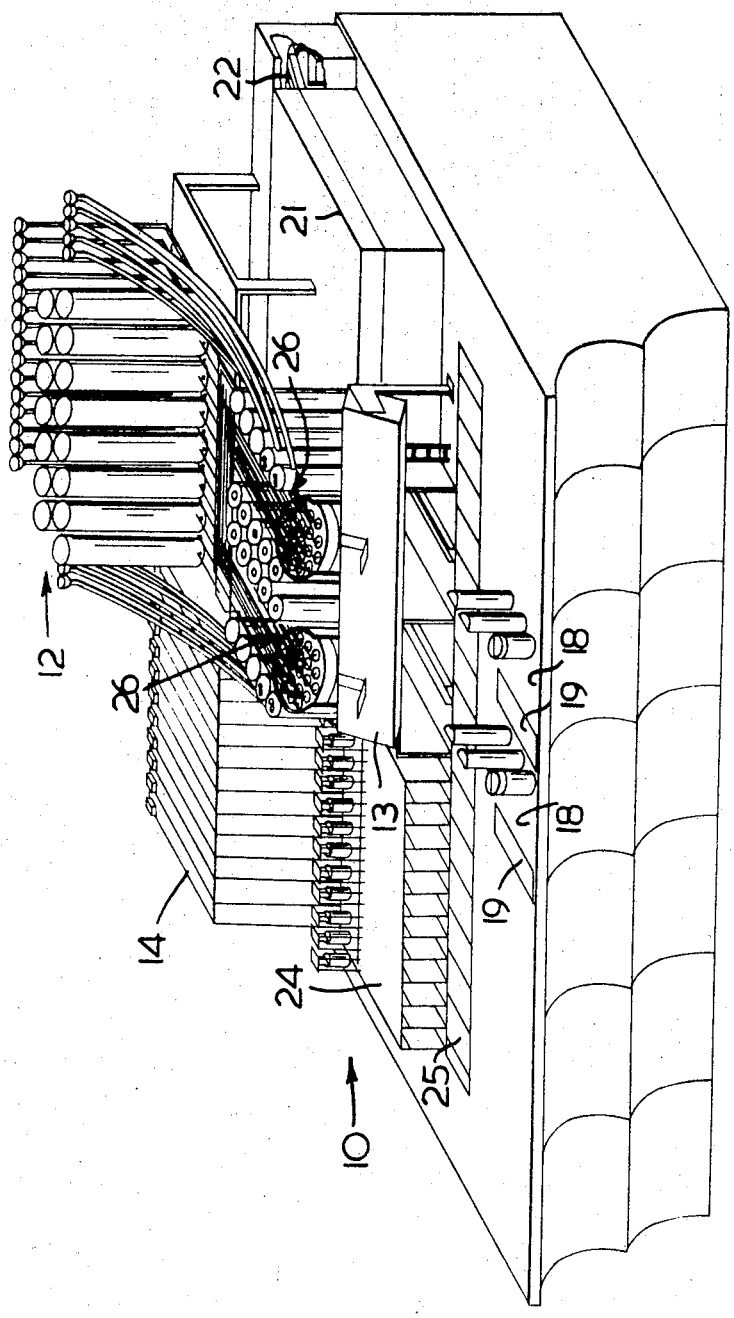
FIG. 2 is an isometric view of the automatic bar dispensing machine with a part of the mechanism exposed.

The major part of the mechanism is shown exposed in FIG. 2. Essentially, the automatic bar 10 comprises an automatic glass washer 21, a glass distribution conveyor 22, some spare trays of glasses, and a glass distributor covered by the exit ejector and mixing stations 26, a liquor, soft drink and bitter reservoir system 12, a main conveyor 25, some counters 18, some order consoles 19, a dirty glass conveyor system 13, some vertically movable trays 14 for bottles of beer and of filler and a dispensing station 24 for dispensing bottle of beer and of filler.

Figure 3:
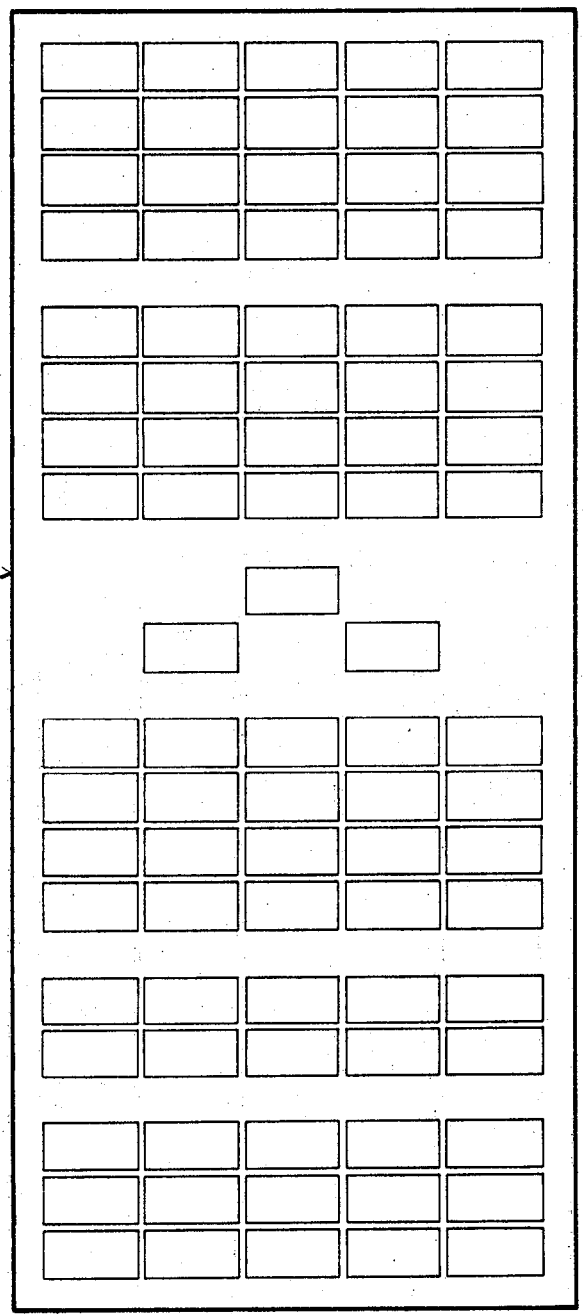
FIG. 3 is an isometric view of an order console.

The specific drink required is selected on one of the order consoles 19 FIG. 3. If it is a mixed drink (or a pure liquor) the order is recorded by the machine electrical circuitry and the main conveyor 25 starts running, closing switches which actuate a portion of one of the exit ejector and mixing stations 26 which inserts the proper ingredients into a funnel; the main conveyor 25 stops and the exit ejector and mixing station 26, by mean of its ejector, inserts the ingredients into the glass while pushing it on the counter 18 beside the order console 19 where the drink can be stirred and/or strained or shaken to be drunk by the consumer. The empty glass is returned to the dirty glass conveyor 13 where it is automatically guided to the automatic glass washer 21 and then to the glass distribution conveyor 22 whereby it is conveyed to the glass distributor or to the spare trays of glasses to maintain a constant supply of glasses for the exit ejector and mixing stations 26.

If the order is a bottle of beer, the order is recorded by the machine's electrical circuitry and a portion of the dispensing station 24 for bottles of beer and of filler is actuated whereby a bottle of a specific kind of beer is pushed out on a section of the main conveyor 25 when, at the same time, information is stored in the associated main conveyor section 30 and the conveyor 25 is actuated to displace the bottle to one of the exit ejector and mixing stations 26 where the stored information commands the main conveyor 25 to stop and one of the exit ejector and mixing stations 26 to push the bottle together with an empty glass on the counter 18 where it is opened and drunk by the consumer. The same things happen if a single bottle of filler is ordered.

If the order is a mixed drink or a straight drink with a bottle of filler, the order is recorded in the machine's electrical circuitry and the bottle of filler gets on the main conveyor 25 to be displaced to one of the stations 26 as in the case of a bottle of beer, but the information stored activates a part of one of the exit ejector and mixing stations 26 to associate the drink ordered and the bottle of filler, so that the filled glass of drink is pushed together with the bottle of filler onto the counter 18 where they are to be blended by the customer and consumed.

Figure 4:
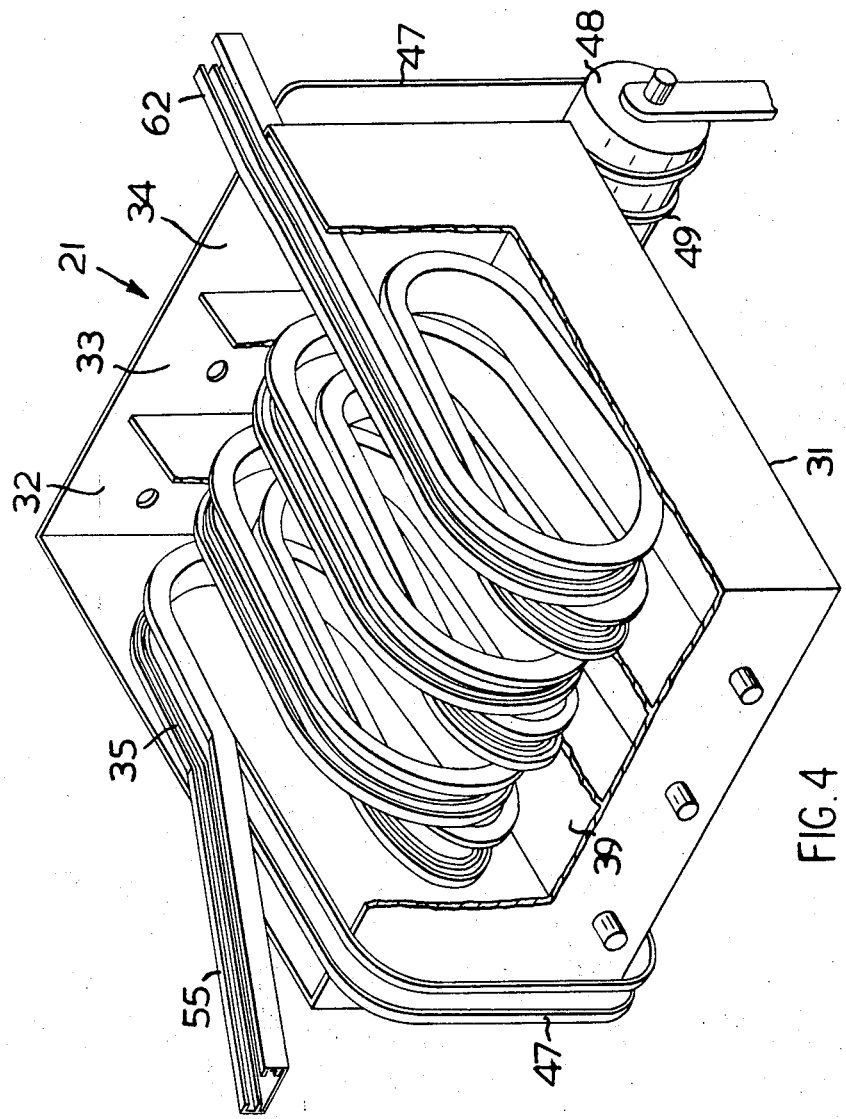
FIG. 4 is an isometric view of the automatic washer.
Figure 5:
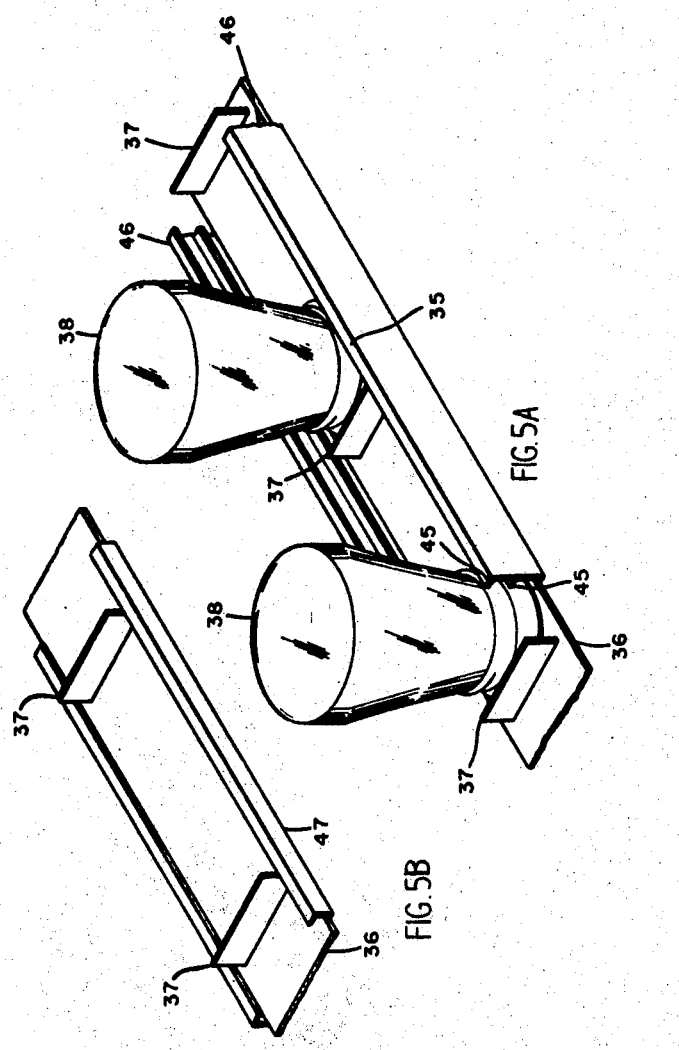
FIGS. 5A and 5B is an isometric view of a part of the washer conveyor belt in a part of the guide bracket associated with two glasses and a part of the belt guide support associated with a part of the belt.
Figure 6:
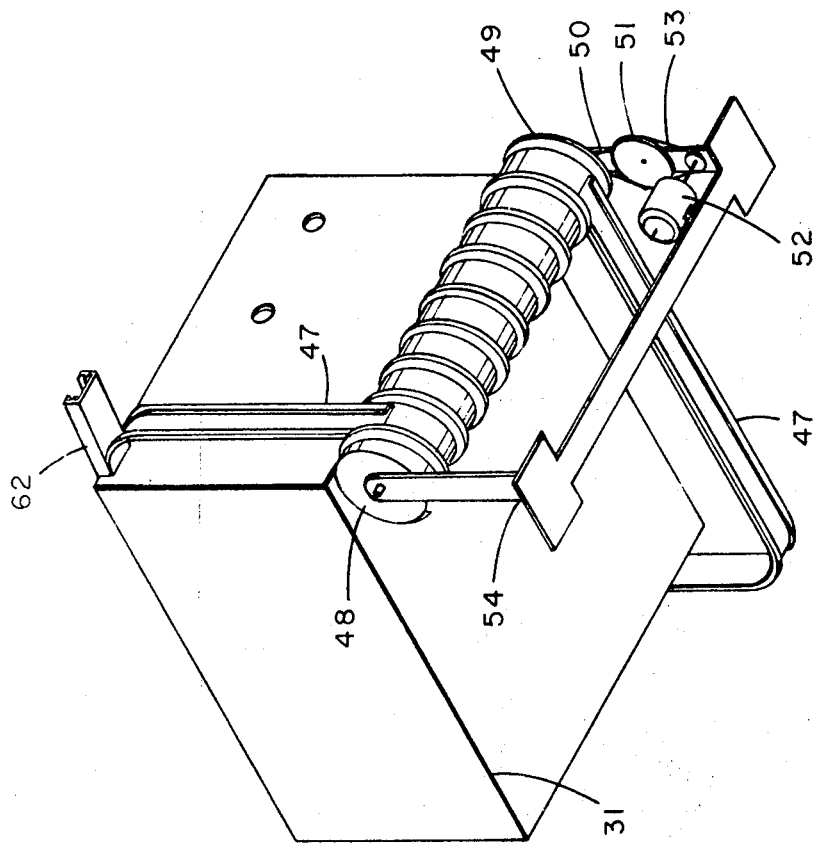
FIG. 6 is an isometric view of the automatic washer and the conveyor belt actuating system.

Referring now to FIGS. 4, 5A, 5B and 6, there is shown (FIG. 4) the automatic washer 21 as comprising a housing 31 divided into three adjacent compartments, the washing compartment 32, the rinsing compartment 33 and the drying compartment 34. Associated with each of those compartments is a guide bracket assembly 35 comprising (FIG. 5A) a conveyor belt 36 with plastic pushing legs 37 to drive the glasses 38. The guide bracket 35 follows the configuration shown by the path 39 on FIG. 4. The guide bracket 35 is of U-shape (FIG. 5A) cross-section with two inner ribs 45 on the inner face of its sidewalls 46 to define two channels herein to retain the glasses 38 by the lower part of their periphery. These are the standard shape glasses for use with the automatic bar. The conveyor belt 36 is supported outside the bracket 35 by the belt support frame 47 (FIGS. 4 and 6) and the actuating cylinder 48. The belt support frame 47 has a suitable shape to hold each side of the belt 36 is it tends to get out (FIG. 5B). The conveyor belt actuating system (FIG. 6) is installed under the housing 31 and comprises an actuating cylinder 48 enveloped by a fixed screw shape guide 49 to avoid a great torsion of the belt 36. The cylinder 48 is actuated by mean of a gear fixed to it and driven by the bicycle chain 50 passing around the small gear fixed to the wheel 51. The wheel 51 is related to the wheel of the electrical motor 52 by the strap 53. The cylinder 48, the screw shape guide 49 and the wheel 51 are supported by the support 54. So, when a glass gets into the sloped brackett guide entrance part 55 (FIG. 4), it slides in the bracket guide 35 to be pushed by one of the conveyor belt flexible legs 37 through the path 39 passing into the washing compartment 32, the rinsing compartment 33 and the drying compartment 34 to go into the sloped brackett guide exit 62 to slide down to the glass distributor conveyor 22. Hot soapy water, clear hot water and hot filtered air are provided and evacuated by the entrance and exit pipes by systems similar to those used in washing and drying machines.

Figure 7:
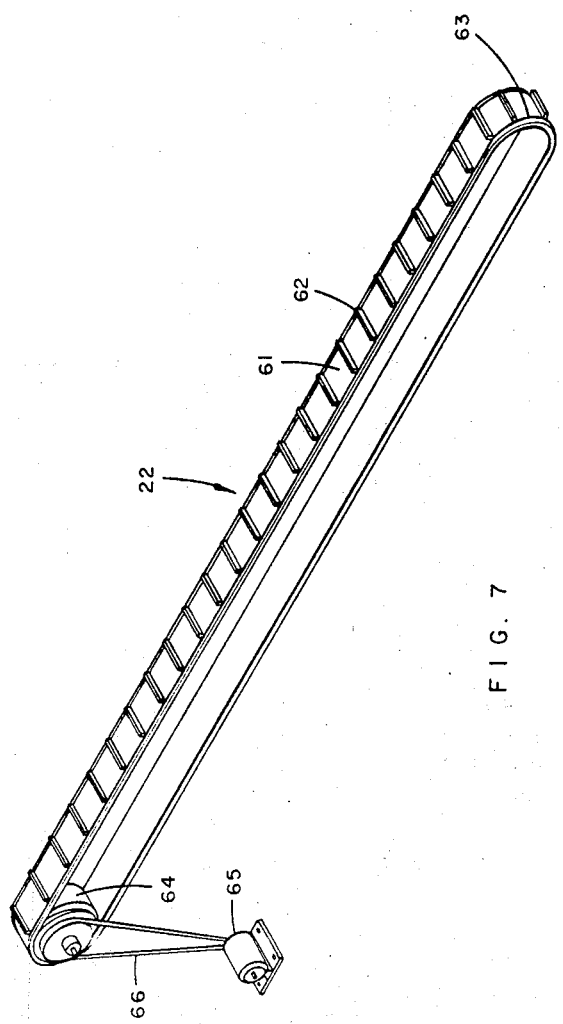
FIG. 7 is an isometric view of the glass distribution conveyor.

FIG. 7 shows the glass distribution conveyor 22 that is at the rear of the bar cabinet 11. This conveyor 22 comprises a belt 61 having transporting guide legs 62 on its upper surface. These legs 62 are fixed to the belt 61 only by one end so that they can bend horizontally. The belt 61 is guided by the glass distributor conveyor bracket 63 and driven by the roll 64 actuated by an electrical motor 65 by mean of a strap 66. The belt 61 is covered with an openable cover to prevent dirt from getting into the glasses. The glasses can pass from the washer 21 to the glass distributor conveyor belt 61 by mean of the bracket exit guide 62 (FIGS. 4 and 5A). When on the belt 61 the glasses are stopped by the wall 68 (FIG. 8) built so to stop them but to leave the flexible transporting guide legs 62 passing under. The glass distributor conveyor bracket 63 is of U-shape with the edges flush with the upper surface of the belt 61 allowing then the glasses to get on and off the glass distributor conveyor 22.

The glasses then slide in the bracket guide exit 62 (FIGS. 4 and 5A) to get onto the glass distribution conveyor belt 61 to be, then, transported and stopped by the wall 68 or by a roll of glasses stopped by the wall 68. At that point, the belt 61 keeps on going and the flexible transporting guide legs 62 bend and push the glasses perpendicularly to the movement of the belt 61. When a glass gets out of a section of the glass distributor 23, a vacant place is created at the entrance of the same section and is filled by one of the glasses pushed by the bent guide transporting legs 62 and an other glass on the belt 61 takes the place of the one gone. If there are too many glasses provided by the washer 21 against the glasses used, the extra ones will be pushed in the trays by the legs 62. If, on the contrary, the washer 21 does not provide enough glasses compare to those used, the trays, because of their small slope, will provide the difference. There is thus a supply of stored glasses always ready for use.

Figure 8:
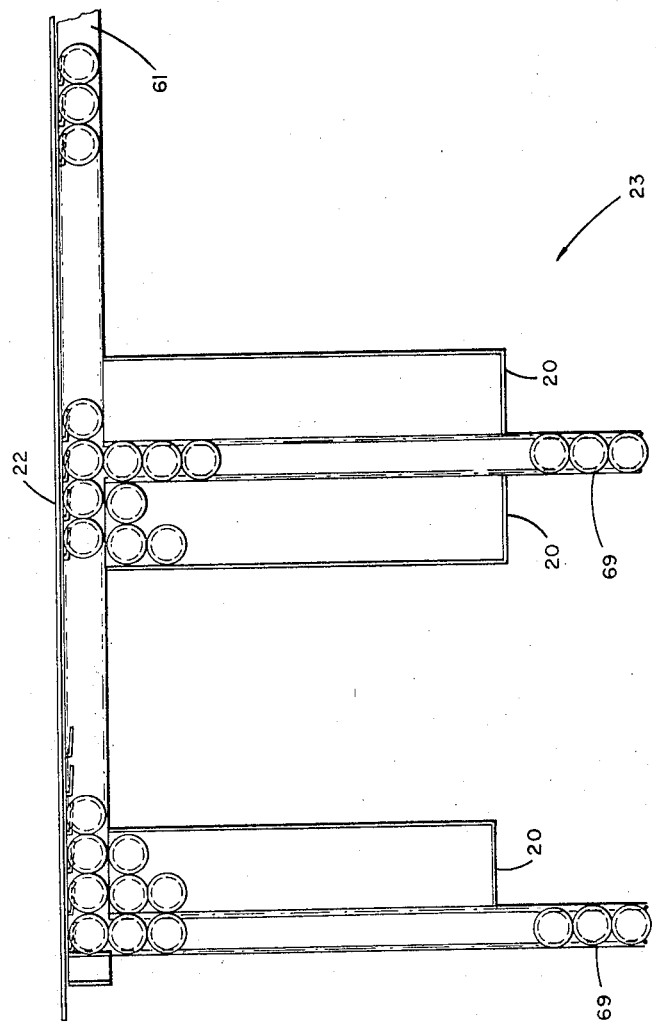
FIG. 8 is a plan view of the glass distributor associated with a part of the glass distribution conveyor and spare trays of glasses covered with glasses.

FIG. 8 shows a plan view of the glass distributor 23 associated with a part of the glass distribution conveyor belt 61 and some spare trays 20 covered with glasses. There are two trays 20 inside each exit and mixing station 26 except for the first station 26 that has one. The glass distributor 23 comprises as many corridors 69 as exit ejector and mixing stations 26. The corridors 69 extend from the glass distribution conveyor 22 to the entrance of the exit ejector inside the mixing stations 26 and have a slope to allow the glasses to slide down in them. A glass bracket guide is on the bottom of each corridor 69 of the exit ejector and mixing stations 26 to keep the glasses stood up when they move. Some small rubber pieces hold the glasses inside the corridors 69 while waiting to be hauled by the exit ejectors 29.

Figure 9:
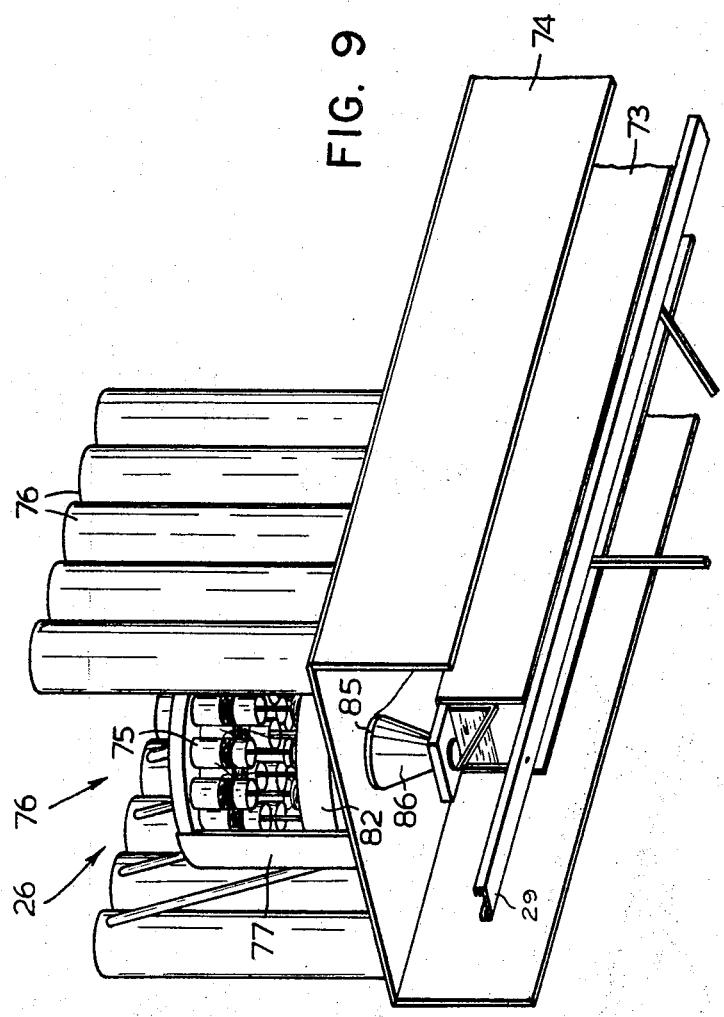
FIG. 9 is an isometric view of an exit ejector and mixing station.

FIG. 9 shows an isometric view of an exit ejector and mixing station 26. The main parts are the liquor, bitter and softdrink dispensing system 75, the solid ingredient storage and dispensing system 76, the main support 74, the exit ejector housing 73 and the exit ejector 29. The driving system is not shown here but is described later in the text and is an other part of an exit ejector and mixing station 26. The trays 20 are each side between the main support 74 and the exit ejector housing 73.

Figure 10:
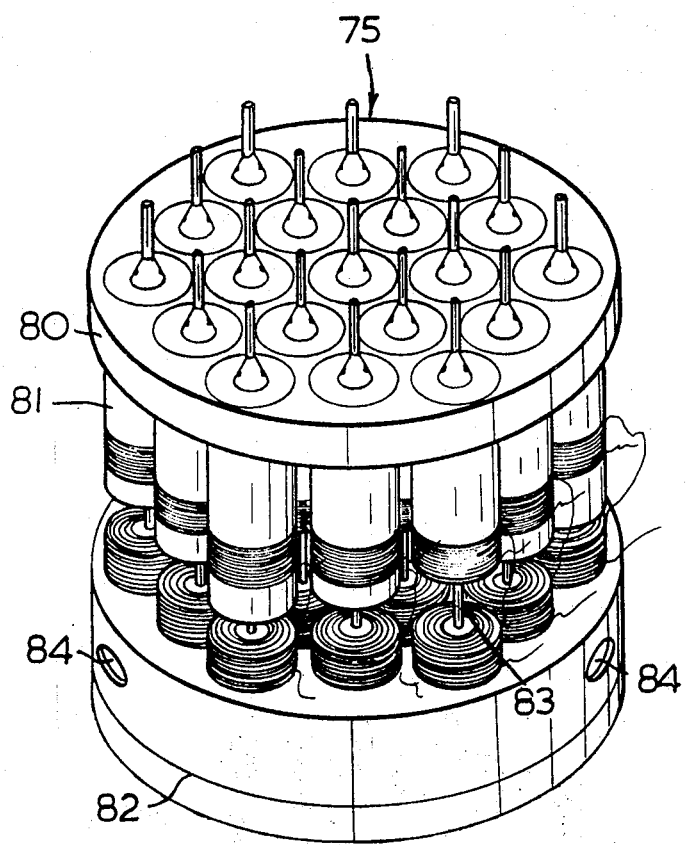
FIG. 10 is an isometric view of the liquor, the bitter and the soft drink measuring and dispensing system.

FIG. 10 shows an isometric view of the liquor, bitter and soft drink dispensing system 75. This system comprises the dispensing valve support 80, the electromagnetic valves 81 and the intermediate dispensing piece 82. The dispensing valve support 80 is fixed to the main support 74 by mean of the piece 77 (FIG. 9) and has all the electro-magnetic dispensing valves 81 fixed each in one of its holes. The intermediate dispensing piece 82 has on its top part one hole for each electro-magnetic valve pipe 83 but the pipe 83 can easily move in it, and on its side some holes 84 one for each different part of the solid ingredient dispensing system 76. The bottom of this piece 82 is focusingly sloped and has an adapter 85 (FIG. 9) to adapt itself to the funnel 86 of the exit ejector 29 (FIG. 9) so that the liquids and the solid ingredients can pass from their respective dispensing system to the funnel 86. Small permanent magnets fixed to the ejector housing 73 and some other fixed to the exit ejector 29, stop quickly the ejector 29 at the end of its cycle in order to align the intermediate dispensing piece 82 with the entrance of the funnel 86. The permanent magnets are not shown.

Figure 11:
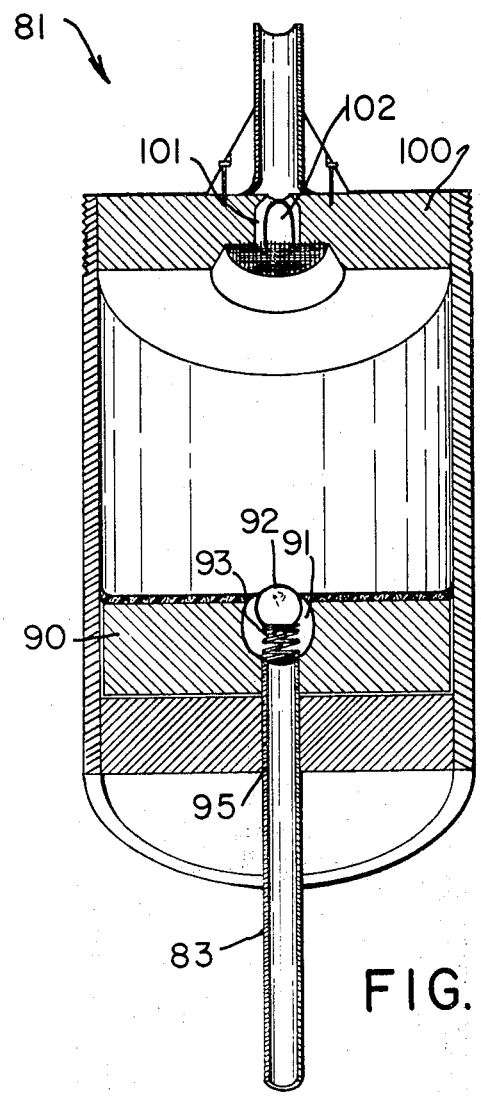
FIG. 11 is a cross-sectioned side view of a dispensing valve.

FIG. 11 shows a cross-sectioned side view of a dispensing valve 81. The dispensing valve 81 comprises a piston 90 having a spherical hole 91 in its middle with a ball valve 92 and a spring 93 fixed to the ball 92 and to the piston 90 inside the hole 91, normally closing its entrance. The dispensing tube 83 is fixed to the piston 90 in a way that the bottom part of the hole 91 is inside the periphery of the tube 83. The piston 90 is stopped at the lower part of the dispensing valve 81 by the bottom 94 of the valve 81. The hole 95 in the middle of thee bottom 94 admits the tube 83. The top part of the valve 81 comprises the valve top 100 having in its center a cylinder shape hole 101 enclosing a cylinder with a semispherical top as valve 102. Normally the hole at the top of the hole 101 is opened leaving the liquid to fill up the dispensing valve 81 and avoiding accumulation of pressure in the valve, but, when the piston 90 is pushed up, it pushes the liquid that pushes the cylindrical valve 102 to close the small entrance of the hole 101; the ball valve 92 is then pushed down by the liquid letting it pass through the hole 91 to the tube 83 and then into the intermediate dispensing piece 82 to go into the funnel 86. The piston 90 goes back to its original position by gravity. Each valve is screwed to the dispensing valve support 80.

Figure 12:
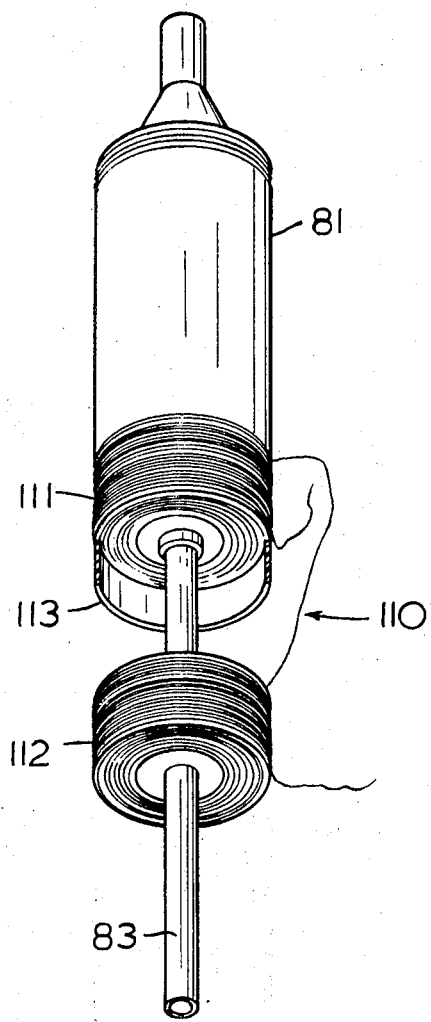
FIG. 12 is an isometric view of the dispensing valve electromagnetic actuating system.

FIG. 12 is an isometric view of the dispensing valve electromagnetic actuating system 110. The magnetic system comprises two electromagnets, one 111 fixed to the bottom of the dispensing valve 81 and the other 112 fixed to the tube 83 that is fixed to the piston 90 as seen before. When the electro-magnets 111 and 112 are energized, there are generated magnetic fields that are contrary one against the other because of their relative polarity, forcing so the two pieces to go one toward the other. The electro-magnet 111 being fixed to the dispensing valve 81, the force applies on the electromagnet 112 actuating so the piston 90 by mean of the tube 83. The path of the piston 90 is controlled by the distance run by the electro-magnet 112 that is controlled by the length of the plastic tube 113 respective to each dispensing valve 81; the quantity is then controlled by the diameter of the dispensing valve 81 and the length of the plastic tube 113. It is so possible to adjust the distance run by the piston 90 for different dispensing valves 81 to have different quantities of different liquors, bitters and soft drinks. It is then possible to mix different drinks together to have a mixed drink. Different mixed drinks can be electrically circuited to be prepared quickly, many times and in exactly the same proportions by only pushing on push buttons. This part of the machine however can provide only different quantities of liquors, bitters, syrups and soft drinks. Some kind of drinks necessitate other ingredients that are provided by other special systems described later.

Figure 13:
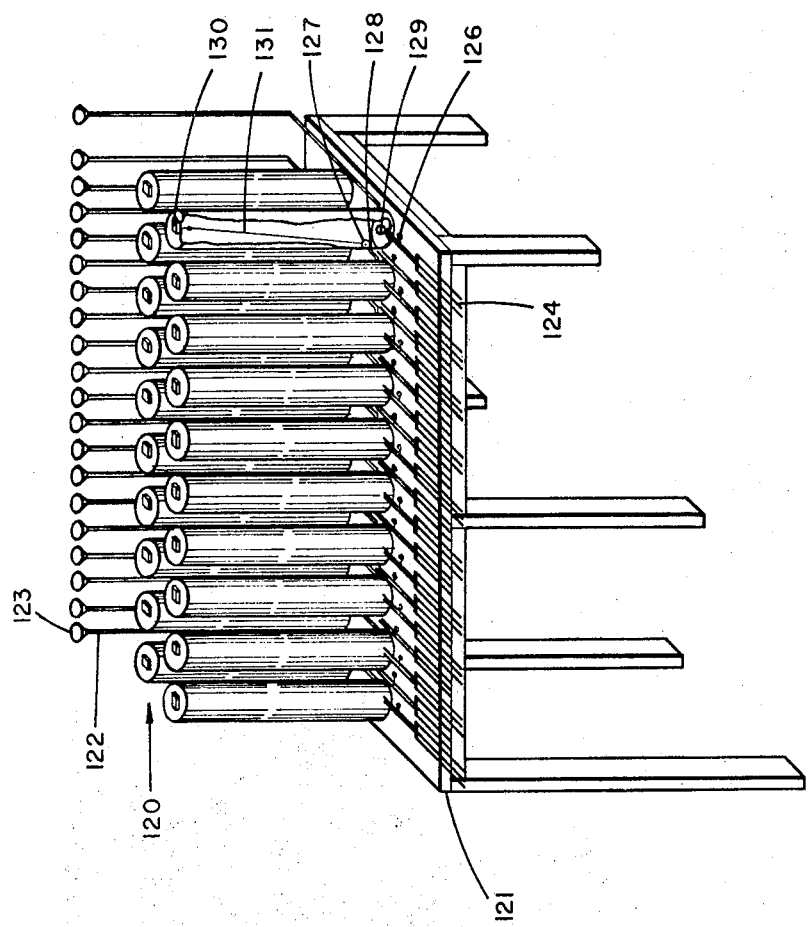
FIG. 13 is an isometric view of the liquor, bitter and soft drink reservoirs and their support.

FIG. 13 shows the liquor, bitter, syrup, sauce and soft drink reservoirs 120 on their support 121. The same set of these reservoirs is used for all the exit ejector and mixing stations 26. The reservoirs 120 and their support 121 are at the rear of the cabinet 11 with the bottom of the reservoirs at a higher level than the dispensing valve supports 80. Each reservoir 120 can be filled up through a specific funnel 123 and its pipe 122. The covers prevent dirt from getting into the funnel 123. The reservoirs 120 fill the electro-magnetic dispensing valves 81 through the pipes 124. A security valve 126 for each reservoir 120 is to cut the stream if a measure valve 81 breaks down. When a reservoir 120 is empty, the float 127 oscillates to become straight and moves vertically because of the metallic piece 128 pulled down by the permanent magnet 129. Both metallic pieces are covered with plastic to avoid chemical reactions. When pulled down, the float 127 actuates a switch in the box 130 by mean of the link 131. The switch, when actuated, puts the corresponding light of the empty indicator board on. So, when a reservoir 120 is empty, the dispensing valve 81 related to it cannot work until the reservoir is filled up again to take the float 127 away from the permanent magnet 129 and have the switch in box 130 at its normal position. It should be noted that nothing but a complete drink can be served even in the case of complicated mixed drinks as we will see later in this text.

Figure 14:
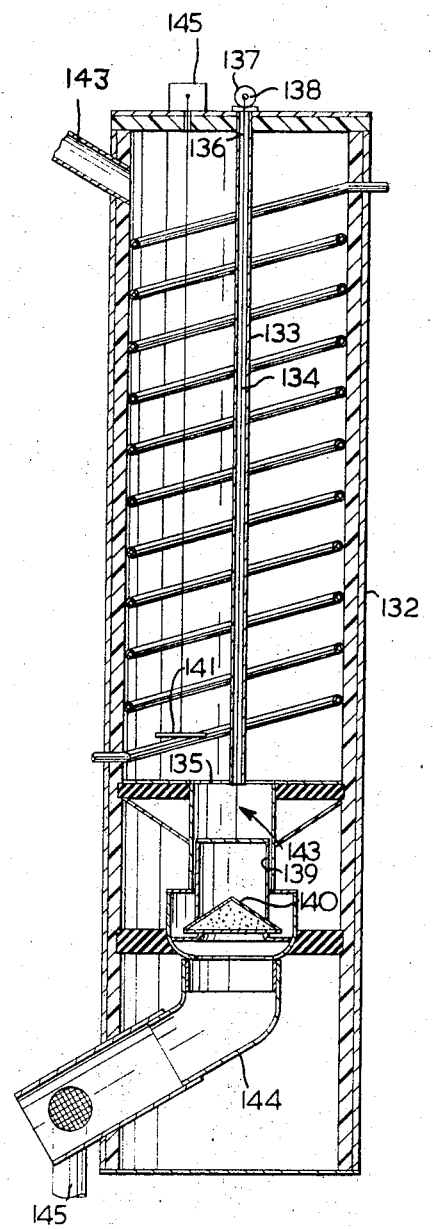
FIG. 14 is a cross-sectional isometric view of the ice cube and granulated ingredient reservoir associated with its measuring, empty indicating and actuating systems.

FIG. 14 is a cross-sectional isometric view of the ice and granulated ingredient reservoir 132 with its associated measuring, empty indicating and actuating systems. The reservoir 132 is an empty cylinder with, inside, some cylindrical corridors 133 each one to protect a string 134. A string 134 is connected through a hole 136 to a small clutch or speed reducer 137 actuated by an electrical motor 138 and is to lift up a movable measure cylinder 139 to dispense an already measured amount of ingredient because the conical bottom 140 is fixed to the reservoir. There are cylinders of different volumes for different quantities. This FIG. 14 shows only one cylinder. The plate 141 in the reservoir 132 is movable and is to actuate the switches in the box 145 when the reservoir 132 is empty. There is a system in the box 145 to lift the plate 140 when the resersoir is filled up. At a normal position the measuring cylinder 139 is filled up with ice or other granulated matter through the cylinder entrance opening 143. The contents are kept inside the cylinders by the conical bottom 140. When a specific motor 138 goes on, it actuates its clutch or speed reducer to lift the corresponding measure cylinder 139 to the point where the cylinder 139 closes the entrance 143 to leave the right quantity going into the pipe 144 around the conical bottom 140. The distance the measuring cylinder 139 goes up is adjusted by the height of the cylinder 135. The measuring cylinder 139 goes back to its original position by gravity. A tube 145 is provided to evacuate the water in the case of the ice reservoir. This reservoir has a cooling pipe inside connected to a compressor that is used to cool the soft drinks, the bitters and the beer as well. It can be provided with other ingredients than those mentionned before if desired to permit preparation of drinks having different recipes.

Figure 15:
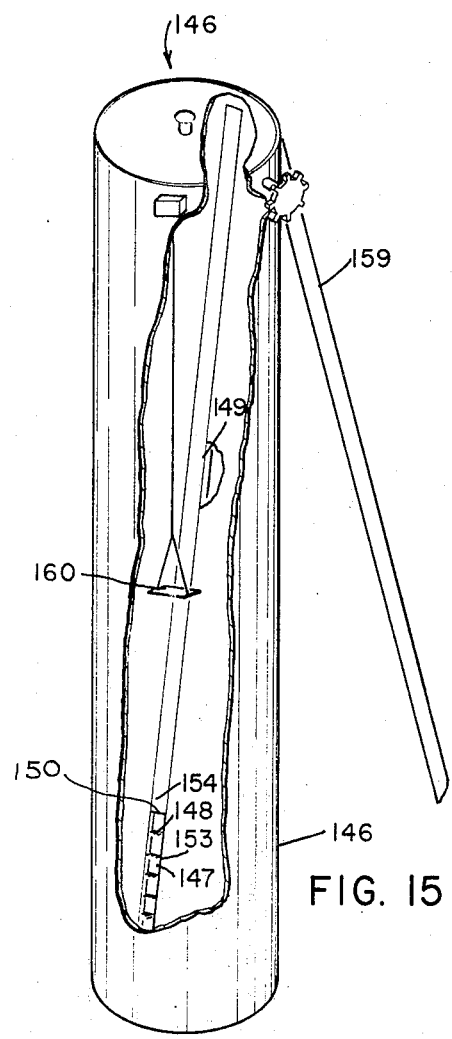
FIG. 15 is an isometric view of the cherry type ingredient reservoir with its carrying and dispensing system.
Figure 16:
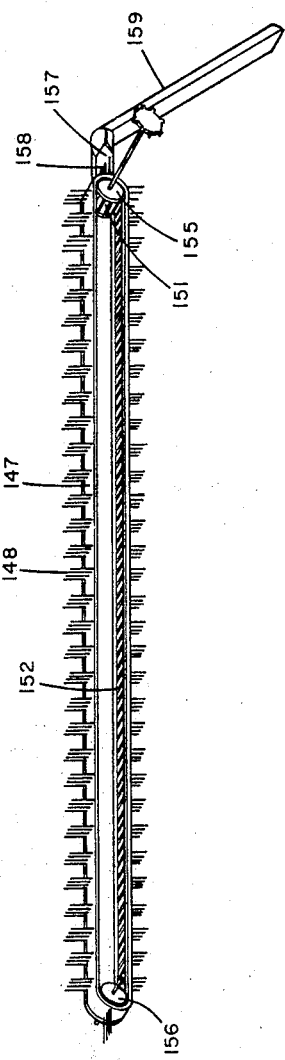
FIG. 16 is an isometric view of the cherry type ingredient carrying and dispensing system.

FIG. 15 is an isometric view of the cherry and olive type ingredient reservoir 146 and FIG. 16 is its carrying and dispensing system 160. The complete system comprises a cylindrical reservoir 146 with, inside, a plastic belt 147 having some finger set carriers 148 on its outside surface, running in a rectangular box 149. There is a hole 150 through the cover of the box 149 over the lower part of the belt 147 to allow the pieces to get, one at a time, between the walls 153 and two sets of fingers 148. When there is one piece inside the little uncovered boxes formed by the walls 153 and the sets of fingers 148, there is no room for an other one, so that, as soon as this part of the belt 147 is under the cover 154, only one piece is inside each compartment. The roll 155 (FIG. 16) with teeth 151 in its middle drives the belt 147 by means of teeth 152 on the inside surface of the belt. The other end of the belt 147 is held by a small plastic roll 156. There is a plastic hand 157 fixed at the top of the reservoir 146 having its fingers 158 between the fingers 148 to get the cherry type ingredients to the tube 159 leading to the intermediate dispensing piece 82. The inside of the reservoir 146 focuses to the hole 150 so that all the pieces tend to get on the belt 147. The driving actuating system has the roll 155 turned a specific angle, just enough so that one and only one cherry type piece can get onto the hand 157 and thence slide down into the tube 159. The empty indicating system is merely a plate 160 such as that for the granulated type ingredients and works the same way (FIG. 14).

The machine to provide pieces of orange type ingredients works the same way with the difference that the pieces of fruit are already cut and are inside a tube just over the uncovered part of the belt.

Figure 17:
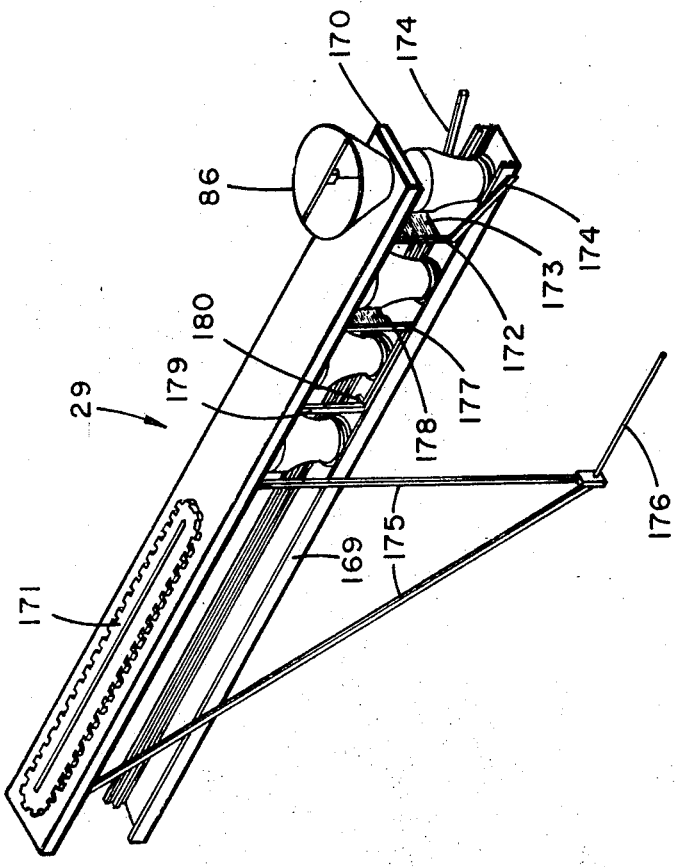
FIG. 17 is an isometric view of an exit ejector.

FIG. 17 shows an isometric view of an exit ejector 29 with some associated glasses in the glass brackett guide 169. The exit ejector 29 comprises the top piece 170 on which are fixed the funnel 86 to receive the dispensed ingredients before being poured into the glasses, the actuating gear 171 to drive the ejector 29 foreward and backward in its housing 73, the first braces 172 on each side to stop the front flexible face 173 when the ejector 29 goes foreward pushing a glass and on which are fixed some permanent magnets to stop almost instantly the ejector 29 at the end of each cycle. The fingers 174 are also fixed to the braces 172 to keep, with the help of the brackett guide 169, the glass aligned with the funnel nozzle 168. The fingers 174 are designed to push a glass and a bottle together when ordered. Other parts of the exit ejector are the braces 175 to support the reset push rod 176, the middle braces 177 to stop the middle flexible face 178 when pushing a glass and the rear braces 179 to support the pivot arms 180 used to grab one glass at a time from the glass distributor 23. The pivot arms 180 can turn inside the ejector but not outside, so that they admit a glass when the ejector goes backward and move it when the ejector goes forward. Springs tend to keep the pivot arms 180 at their normal position that is as shown on this FIG. 17. The faces 173 and 178 are made of light sticks of plastic or wood linked together with fine thread so that in conjunction with their respective braces 172 and 177 push the glasses when the ejector 29 goes foreward but pass over when it goes backward. The faces 173 and 178 and the pivot arms 180 are so positioned against themselves that at the end of the ejector 29 cycle there will be a new glass on the same places than at the beginning of the cycle ready to make an other cycle.

Figure 18:
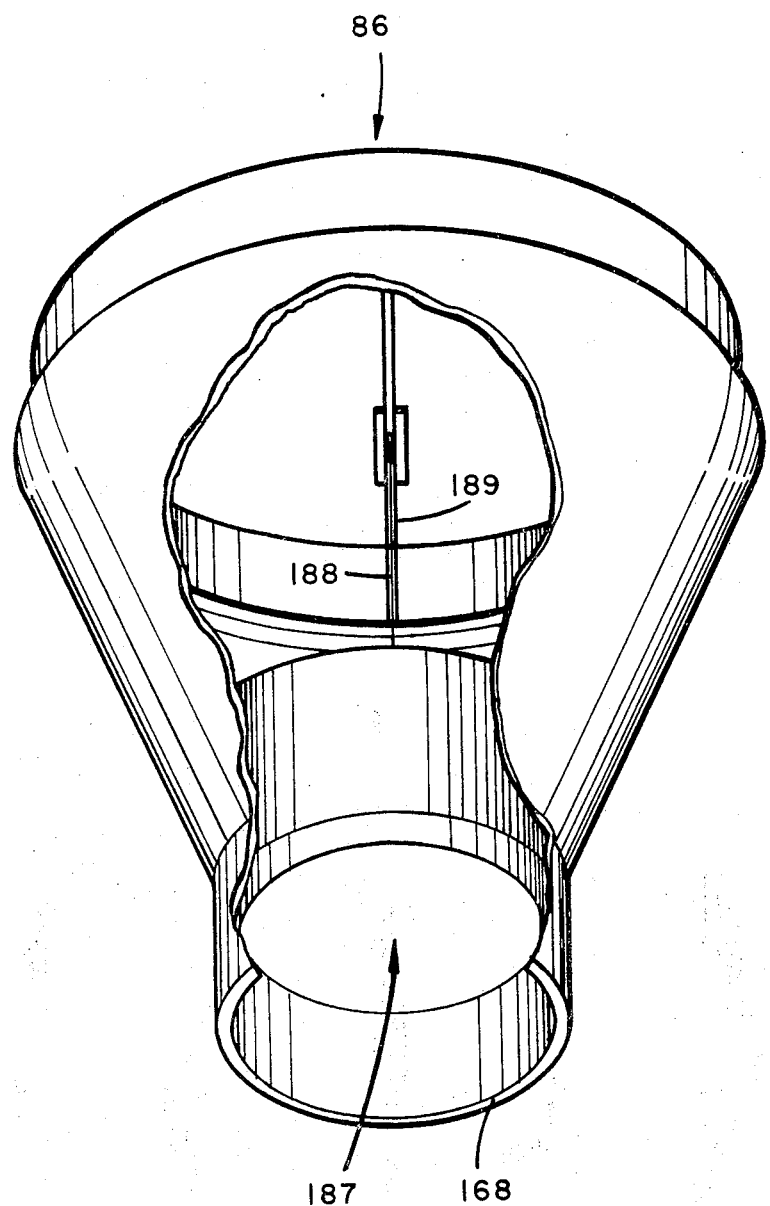
FIG. 18 is an isometric view of a dispensing funnel and its plug system.

FIG. 18 shows an isometric view of a dispensing funnel 86 associated with its plug system. The ingredients are kept in the funnel 86 while waiting to be served, by mean of a plastic-metallic plug 187 normally closing the nozzle 168. The plug 187 can be lifted up by the elastic string 188 when it is tight enough. The elastic string 188 passes inside the guiding support 189 and is fixed to the ejector housing 73 but has a slack to permit the exit ejector 29 to place the funnel nozzle 168 just over the front glass entrance before the plug 187 is taken up. So the ejector starts to go foreward with the funnel 86 filled with ingredients, at a certain point the front glass is touched by the front face 173 of the ejector 29, at that point in time the glass is just under the funnel nozzle 168 and will stay there while being pushed because of the bracket guide 169, the fingers 174 and the face 173 even if a bottle is pushed with it later. The fingers 174 are long enough to accept a glass and a bottle. After a certain distance the elastic string 188 becomes tight enough to lift up the plug 187 and the ingredients get into the front glass while the ejector 29 pushed it onto the counter 18. When the ejector 29 goes back leaving the glass on the counter, the plug, after a certain distance run back by the ejector 29 will go down by gravity to close again the nozzle 168.

Figure 19B:
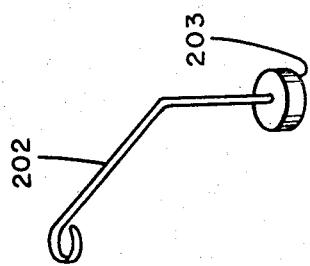
FIGS. 19A and 19B is an isometric view of a section of the actuating gear associated with the motor gear, the motor shaft and the motor retaining guide.
Figure 19A:
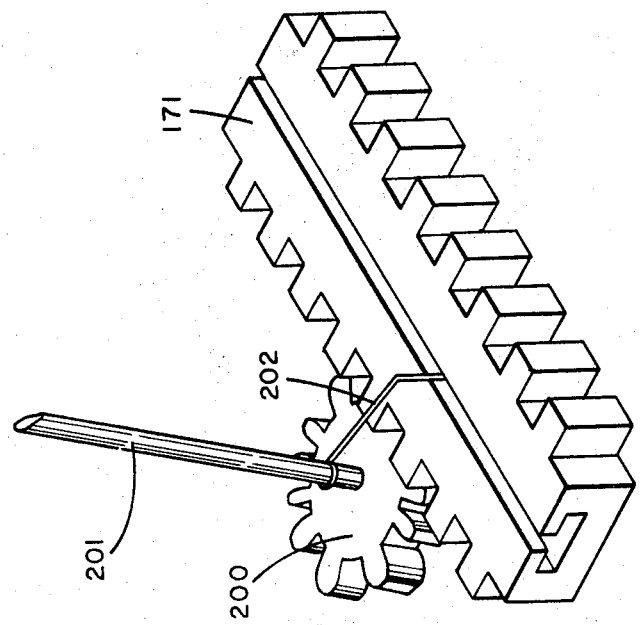

FIGS. 19A and 19B show a section of the actuating gear 171 associated with the motor gear 200, the motor shaft 201 and the motor retaining guide 202. The motor retaining guide 202 keeps the motor gear 200 in contact with the actuating gear 171 mainly at its two ends. The small roll 203 guides the retaining guide 202 when the actuating gear 171 moves and allows the retaining guide 202 to turn 180° at each end of the actuating gear 171. The motor that drives the shaft 201 can oscillate perpendicularly to the move of the ejector 29 but not parallely to it. The motor gear 200 always turns clockwise so that when the gear 200 is on the left side of the actuating gear 171 the ejector 29 goes forward but when on the right side the ejector 29 goes backward. The transfer from one side to the other is done because of the shape of the actuating gear 171, the retaining guide 202 and its guiding roll 203.

The order is then on the counter 18 ready to be consumed or ready for some physical treatment such as stirring, straining, shaking etc., after which it can be consumed. After the drink is consumed, the glass can be conveyed to be washed automatically by putting it on the small balcony in front of the counter 18.

Figure 20:
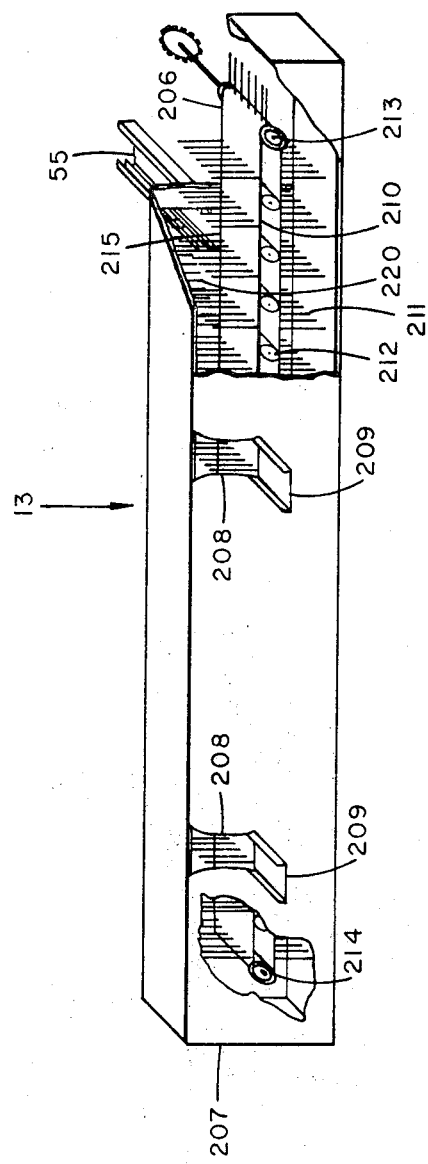
FIG. 20 is an isometric elevation view of the dirty glass conveyor.

FIG. 20 shows an isometric elevation view of the dirty glass conveyor system 13. The conveyor 206 itself is enclosed in a box 207 having as many openings 208 as the bar has counters 18. Each opening 208 has its balcony 209 where the glass is put on after consumption. The box 207 is normally sloped so that the glass can slide into the box 207 onto the belt 210 when on the balcony 209. The flexible belt 210 has on its exterior surface, many rows of flexible fingers 211 forming with it and the box 207 enclosures just large enough to accept one glass in its correct position or upside down, but not enough to accept a glass on the side. The possibility of having a glass upside down is eliminated by the fact that the shape of the entrance 208 cannot accept a glass upside down. The belt 210 top part is kept straight and at the same level than the entrances and the exit by rolls 212. The belt 210 is driven by a roll 213 that is in its turn driven, by mean of its gear, by an electrical motor. The other end of the belt 210 is supported by a free roll 214. The glasses can then be transported by the belt 210, one in each enclosure, to the sloped bracket guide entrance 55 of the automatic washer 21. Each glass is lead from the belt 210 to the entrance 215 of the sloped braket guide entrance 55 by mean of the row of rigid fingers 220 making an angle with the rows of fingers 211 and having its fingers enligned with the middle of the distance between the fingers of the rows 211. The rear end of the row 220 is at the right side of the entrance 215. If a broken glass or something else is inserted into the box, it will not get into the washer 21 because of the length of the fingers 220 is such that they can guide to the washer only pieces almost as high and stable as the type of glass used. Other material will go straight in the low part of the box 207 and stay there to be removed by hand.

If we consider now the case where a bottle of beer or of filler is ordered, we have, first, to have a look at the bottle storage and providing system that is composed of automatic vertical movable dispensing trays, one set for each kind of beer and each kind of filler.

Figure 21A:
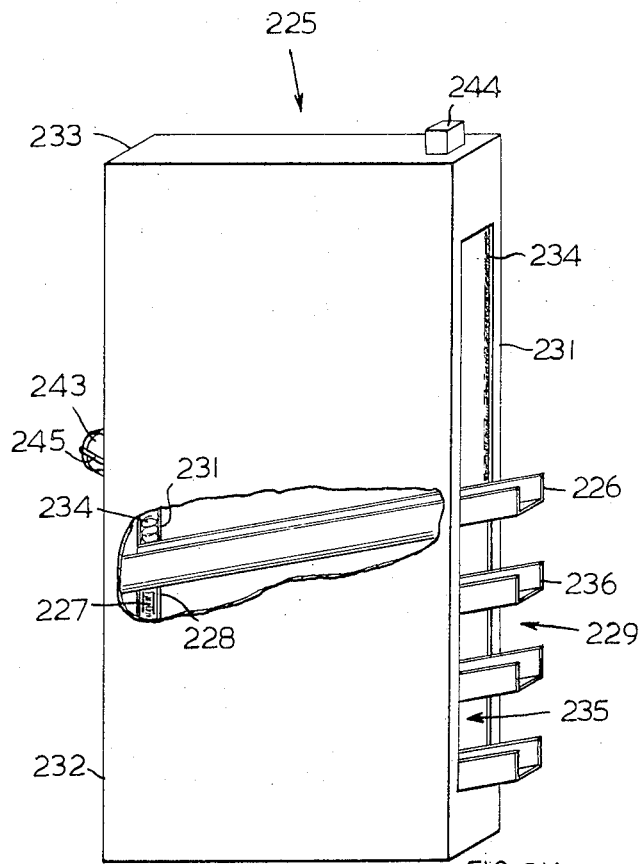
FIGS. 21A and 21B is an isometric view of the bottle of beer and of filler automatic vertical movable dispensing tray and its moving control system.
Figure 21B:
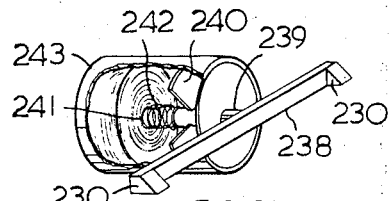

FIG. 21A and 21B is an isometric view of a bottle of beer and of filler automatic vertical movable dispensing tray 225 and its moving control system. The bottle of beer and of filler automatic vertical movable dispensing tray 225 comprises sloped trays 226 linked together by mean of solid rods 227 and metallic corners 228 at each corner to form the tray set 229. The tray set 229 can move vertically in the four corner guides 231 of the box 232 and is activated by four springs 234 fixed one at each corner of the top of the box 232. The front part 233 of the box 232 is closed except at the level of the bottom of the dispensing station 24, to allow the bottles to slide from the tray sets 229 into the dispensing station 24. The trays can be filled through the open rear part 235 of the box 232 by putting bottles on the tray guide entrances 236 to slide in the tray and be stopped by the closed front part at the low part of the box 232. It should be noted that before being filled, the tray set 229 should be taken down. It will stay there automatically because of the stoppers 230 (FIG. 21B). As soon as a tray providing bottles to the dispensing station 24 is empty, an electrical signal given by the last bottle of the tray has the stoppers 230 taken off for a short period of time to permit the tray set 229 to be pulled up by the springs 234 to stop when the next tray will be to the correct level which is controlled by holes, for each tray, in the two front metallic corners 228 of the tray set 229. The stoppers 230 enter these holes to stop the tray set 229. These stoppers 230 have a 45° square cut shape so that they disengage automatically from the holes if the tray set 229 is pushed down and engage with the holes to stop the tray set 229 if it is pulled up as described before. These stoppers 230 are fixed to the square piece 238 that is fixed to a rod 239 which has a metallic disc 240 at the other end. This disc 240 is there to actuate the stopper system by magnetism, i.e., when the electro-magnet 241 is energized it pulls the disc 240, pulling so the stoppers 230. When the electromagnet 241 deenergizes, the spring 242 pushes the stoppers 230 against the front metallic corners 228 (FIG. 21A) of the tray set so that they engage with their holes when at the same level. The cylinder 243 (FIGS. 21A and 21B) containing the stopper actuating system is fixed to the tray system 225 by a three legs support 245. When all the trays of a tray set 229 are empty, the switch in the corresponding box 244 is actuated and corresponding lights of the "empty indicator board" go on indicating that the trays of this tray set 229 have to be filled and that no order called after the switch is on will be recorded by the machine before the trays are filled.

Figure 22:
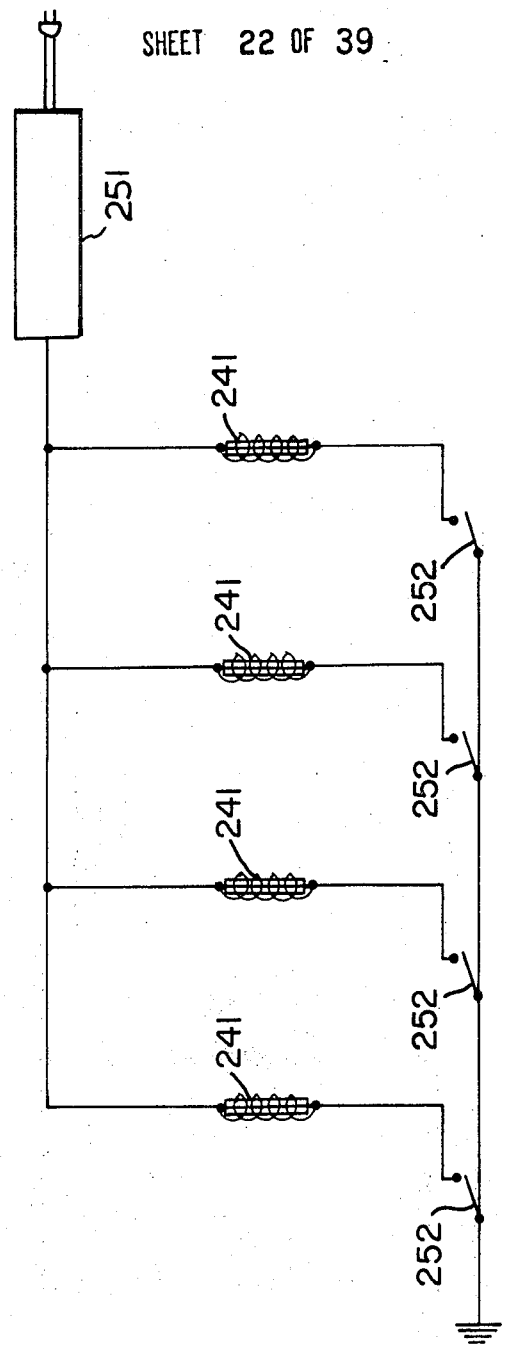
FIG. 22 is a schematic of the electrical circuitry for the automatic vertical movable bottle dispensing trays.
Figure 30:
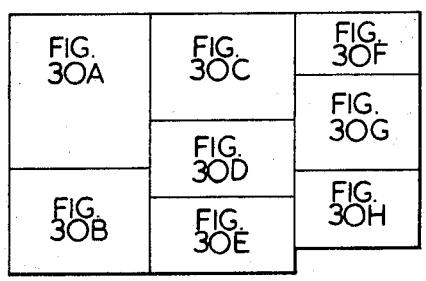

FIG. 22 is a schematic diagram of the electrical circuitry for all the automatic vertical movable bottle dispensing trays 225. The switches 252 fixed to a movable part of the bottom at the first end of the corridor extending from the set of trays 229 to the corresponding part of the dispensing station 24, are normally closed by the bottle next to the dispensing tray of the set of trays 229. When a tray is empty, the corresponding switch 252 is actuated and the power supply 251 discharges in the corresponding tray set 229 electromagnet 241 thus allowing the tray set 229 to rise so that another tray is in register to provide bottles. When the last tray of a tray set 229 is empty, the switch in the box 253 (FIG. 21A) is actuated to put lights of the "empty indicator board" 15 on, and to cut the circuits that can record other orders of a bottle of this ingredient. The corridors extending from the sets of trays 229 to the dispensing station 24 are sloped as are the trays themselves so that the bottles can slide down from the trays to the station 24 to be stopped by rubber bumpers at the entrance of the ejector.

Figure 23:
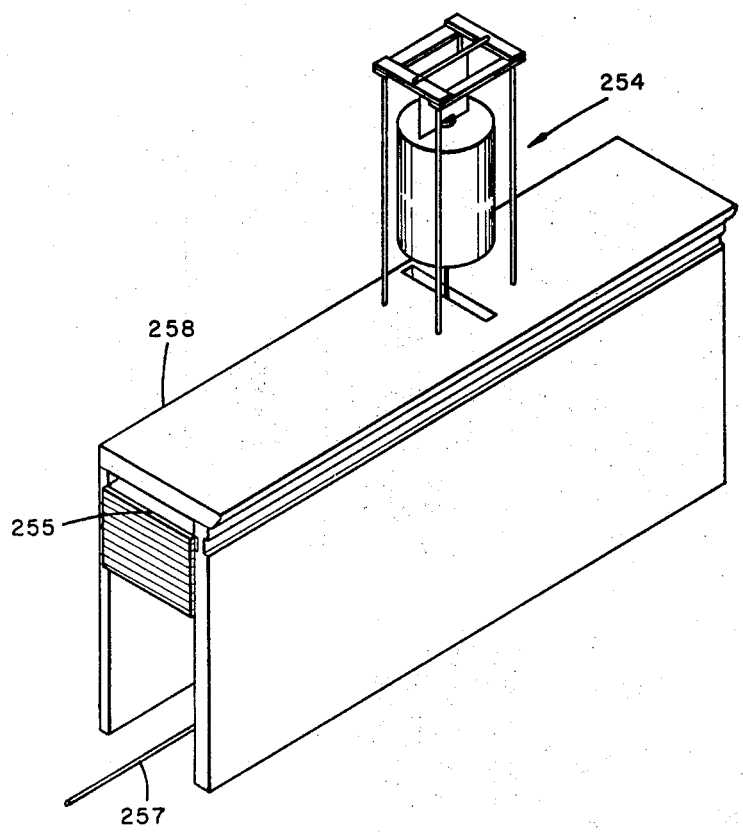
FIG. 23 is an isometric view of the bottle of beer and of filler ejector in its housing.
Figure 24:
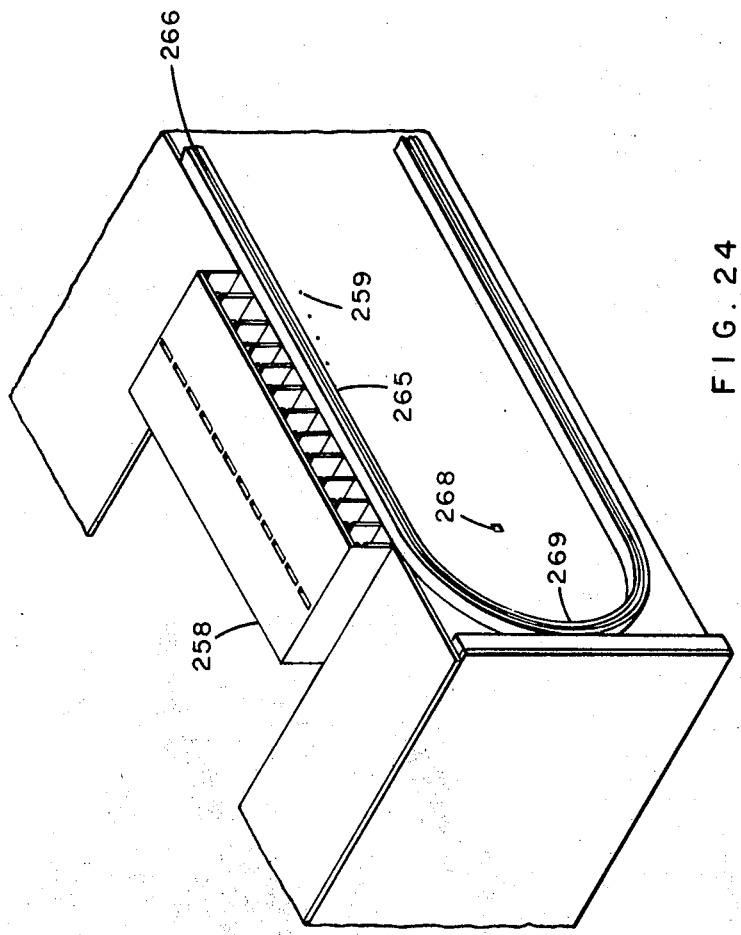
FIG. 24 is an isometric view of the bottle of beer and of filler ejector housings associated with a part of the rear part of the main conveyor support frame.

FIG. 23 is an isometric view of the entrance ejector 255 for bottles of beer and of filler in its housing 258. The entrance ejectors 255 are like the exit ejectors 29 although their measurements are different and they work the same way with the same kind of driving system 254. The indicating push rods 257 correspond to the reset push rods 176 but are at a different horizontal level for each kind of beer and filler. The housing 258 is like the exit ejector housing 73 although its measurements are different. Normally the entrance ejector 255 is inside its housing 258 with the end of its indicating push rod 257 in the push rod hole 259 (FIG. 24). All of the entrance ejectors 255 with their specific housings 258 form the dispensing station 24. When an order for a bottle of beer or of filler is made at an order console 19, a part of the dispensing station 24 is activated and the main conveyor 25, if certain conditions described later are present, stops and an entrance ejector 255 goes forward sliding in the cavities, one in each edge of the housing, pushing the bottles as was described for the glasses in the case of the exit ejector 29. At the same time, the entrance ejector indicating push rod 257 gives signal through its hole 259 (FIG. 24) to the section of the main conveyor 25 that will transport the bottle to identify the kind of beer or filler in the bottle.

FIG. 24 is an isometric view of the ejector housings 258 for bottles of beer and of filler associated with a part of the rear part of the main conveyor support frame 265 seen from the front. There will be shown later the corresponding front part of the conveyor support frame 265. There are shown the holes 259 one for each housing 258 but at different level as mentionned before to identify the bottles provided by an housing 258. The rear part of the main conveyor support frame 265 has a rectangular shape with half circular ends 269. There is, in the center of the support 265, a cavity 266 to hold and guide the main conveyor sections described in the next paragraph. An opening at the bottom of each housing is to allow the indicator push rod support to slide in when the ejector runs The hole 268 provides an opening for the electrical wiring.

Figure 25A:
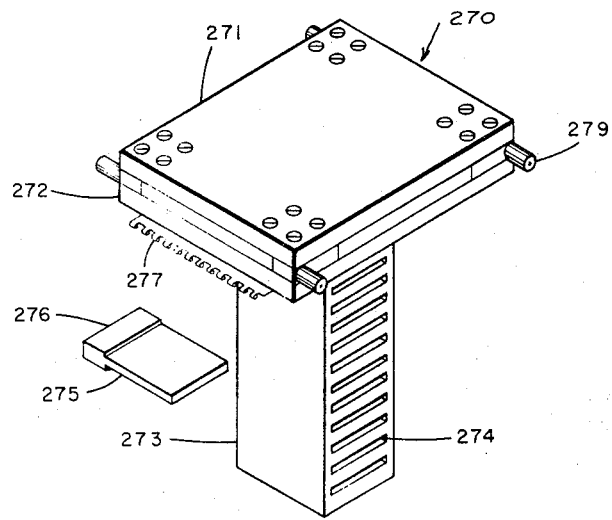
FIGS. 25A and 25B is an isometric view of a section of the main conveyor.
Figure 25B:
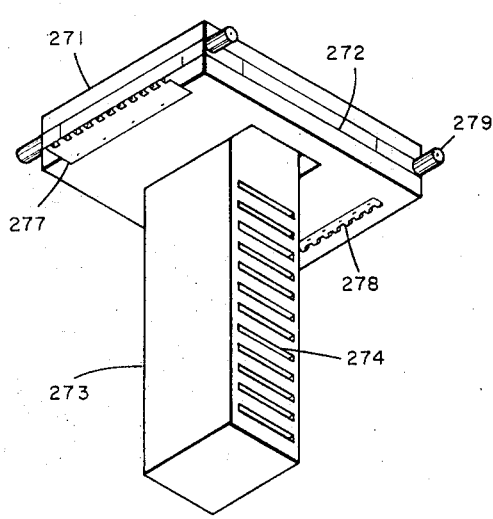

FIGS. 25A and 25B are isometric views of a section 270 of the main conveyor 25. FIG. 25A is a view taken from above the piece, and FIG. 25B a view taken from under the piece. A section 270 comprises a carrier board 271 which is the cover of the main conveyor section 270 and which is used to carry the bottles, a head 272 supporting an indicator support 273 that has some information storage sections 274 and supporting rolls 279. Each information storage section 274 encloses an indicator stick 275 that can move a certain path forward and backward inside. The stick 275 is of T shape with a head 276 that will serve to push the indicator support 273. Each main conveyor section 270 is linked to two others by a hinge, each part 277 and 278 at each end of the section 270. Because of the hinges, the section 270 can move clockwise to follow the path given by each semi-spherical end 269 of the main conveyor support frame 265. The sections 270 are supported and guided against the main conveyor support frame 265 by the rolls 279. The rolls 279 are the parts of the sections 270 in the cavities 266 of the main conveyor support frame 265. They are responsible for keeping the carrier boards 271 at the same level than the edges of the top straight part of the main conveyor support frame 265. These rolls 279 also permit easy movement of the main conveyor 25 as it rolls in the cavities 266 of the frame 265. The indicator supports 273, because of the hinges mentionned before, are always at the same distance from the others on the straight top part of the support frame 265. The distance between the indicator supports 273 is equal to two times the distance between the switches activating the entrance ejectors 255 so that half of the kinds of beer and filler available can be served at the same time on the main conveyor 25. In other words, in two times one bottle of each kind of beer and filler available can be served on the main conveyor 25. Thus, in only two simple operations one bottle of each kind of beer and filler available can be served if they are all ordered at the same time. The main conveyor 25 is driven by rubber rolls in contact with the top surface of the carrier boards 271 at the bottom straight part of the main conveyor support frame 265 as we can see on FIG. 28.

Figure 26:
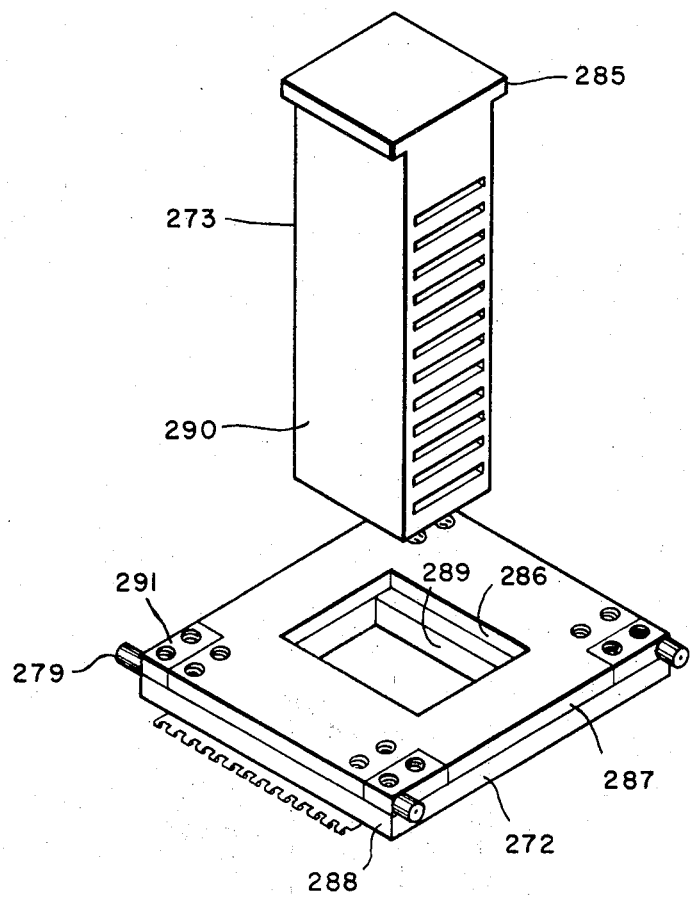
FIG. 26 is an isometric view of the bottom part of a main conveyor section head and its associated indicator support.

FIG. 26 is an isometric view of the bottom part of a main conveyor section head 272 and its associated indicator support 273 taken out of the main conveyor section head 272. The indicator support T shape head 285 permits the indicator support 273 to be supported and to slide forward and backward in the hole 286 of the top part 287 of the section head 272. The hole 286 is about the same width but longer than the indicator support head 285. The bottom part 288 of the section head 272 has a hole 289 having about the same width than the indicator support tail 290 and the same length than the top part hole 286 supporting so the indicator support 273. The metallic parts 291 are to fix the rolls 279 to the main conveyor section 270 by mean of screws linking the carrier board 271, the section head top part 287 and the section head bottom part 288 together with the indicator support head 285 free to move forward and backward inside the bottomless box formed by the pieces.

Figure 27:
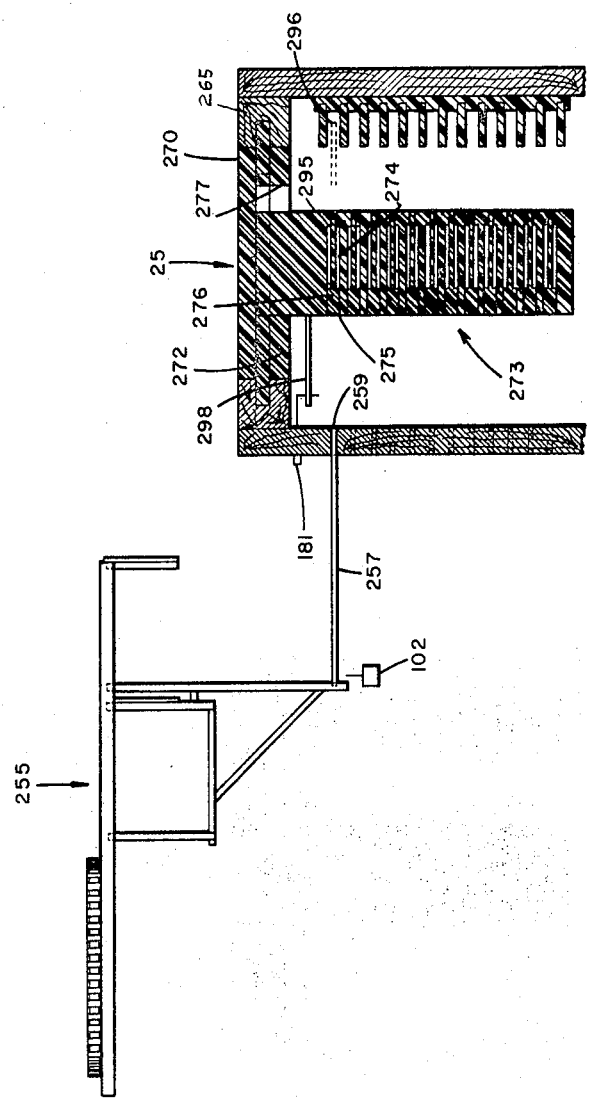
FIG. 27 is a cross-section side view of the main conveyor in its support frame associated with an entrance ejector.

FIG. 27 is a cross-section side view of the main conveyor 25 in its support frame 265 associated with an entrance ejector 255. Its indicating push rod 257 is in the topmost push rod hole 259 while the others, not shown here, are in the other push rod holes 259. The center of each push rod hole 259 is at the same level as the center of the corresponding information storage sections 274 so that the push rod 257 of an ejector 255 can push the corresponding indicator stick 275 forward inside its information storage section 274. Each information storage section 274 is a rectangular shape hole with a one step staircase cross-section side shape as shown on this figure. When the stick 275 is pushed by a push rod 257, the indicator stick head 276, at a certain point on its path, meets the step 295 of the information storage section 274 and pushes the indicator support 273 since the push rod 257 keeps on pushing. The push rod pushes the indicator stick 275 to the position 296 and the indicator support 273 to touch the front end 297 of the hole 289. A switch closer stick is fixed to the rear face of each indicator support 273 between the bottom of the conveyor section head 272 and the uppest information storage section 274. These sticks 298, if their respective support 273 is not pushed, close temporarily half the switches in the boxes 181 at a time, the arms of the switches being on their path. As soon as at least one of the switches is sensed because of an order, the switch concerned makes the main conveyor 25 stop and the corresponding entrance ejector 255 start to go forward to push a bottle on the main conveyor 25. It should be noted that there is a switch in a box 181 for each entrance ejector 255.

To sum up, an order for a bottle of beer or of filler is registered on a console 19, the main conveyor 25 starts running and runs until a switch closer stick 298 closes the switch in the box 181 temporarily to activate a particular entrance ejector 255. The main conveyor 25 stops and the ejector 255 starts going forward. In so doing, the corresponding push rod 257 goes foreward through its push rod hole 259, the level of which depends on which entrance ejector 255, i.e. which beer or filler has been ordered. After a while, the push rod 257 reaches a specific indicator stick 275 and pushes on one of its end in its information storage section 274 and the other end out of the information storage section 274 until the indicator stick head 276 touches the step 295; at that point, the indicator support 273 itself is pushed until the end of the ejector 255 first half cycle where the indicator stick 275 front end is at the position 296. The ejector 255 then returns to its original position closing temporarily, at the end of the cycle, switches in the box 102 which stop the ejector 255 and restart the main conveyor 25 leaving the moved parts of this main conveyor section 270 at their final position. The system now carries information about which kind of beer or filler is on this section 270 of the main conveyor 25, information given by the specific indicator stick 275 that has been pushed forward, and the switch closer stick 298 that is fixed to the indicator support 273 that has also been pushed forward. This prevents another switch from being closed, this preventing a second bottle from being pushed on this section during its travel to destination, i.e., on the counter 18 beside the console 19 where the order has been registered.

Figure 28:
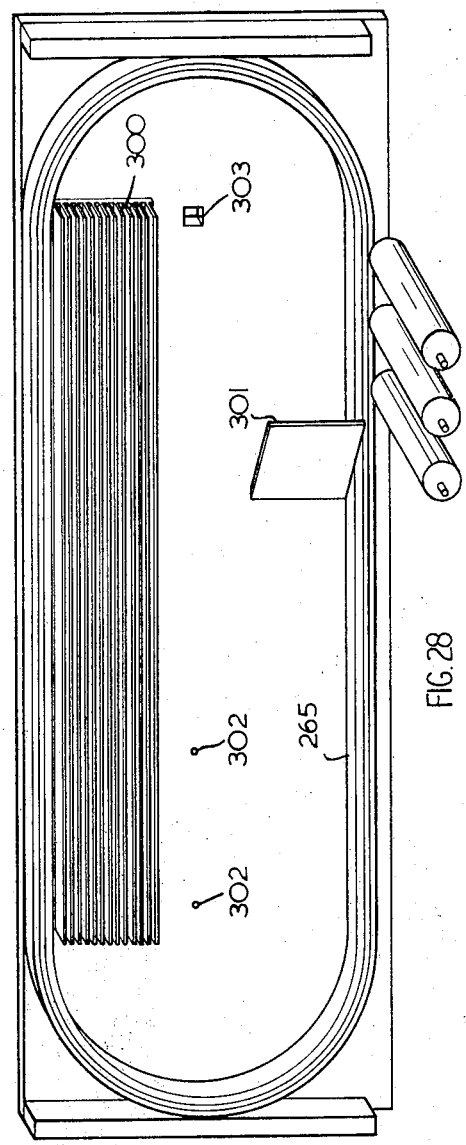
FIG. 28 is an isometric view of the sensing channels and the front part of the main conveyor support associated with the indicator stick reset board.

FIG. 28 is an isometric view of the sensing channels 300 and the front part of the main conveyor support frame 265 associated with the indicator stick reset board 301. It is shown here as the entrance ejectors 255 see it, i.e., from behind the main conveyor 25. The main conveyor 25 top, on this figure, moves from right to left. The channels 300 are to guide the indicator sticks 275 and to support certain switches that the indicator sticks 275 will actuate to associate a glass filled with mix drinks or a straight drink or merely an empty glass to a bottle and to control the exit ejector motors and the main conveyor motor. There is one channel 300 for each kind of beer and of filler. The holes 302 each correspond to an indicator support 273 reset system at each counter 18 of the bar 10. The hole 303 is for some electrical wires. The board 301 has a small angle with the frame 265, is large enough to push at the same time all the indicator sticks 275 back in their information storage section 274, and long enough to push them flush with the front face of their supports 273. The same board 301 serves for all the main conveyor sections 270. This, each time a section 270 pass in front of the board 301, all the sticks are returned to their original position, ready to be used again.

FIG. 29 is an isometric view of an indicator support reset mechanism 305 associated with a section 270 of the main conveyor 25 and of the sensing channels 300. The indicator support reset mechanism 305 is a lever system with a main rod 306, an indicator support actuating rod 307 and a main rod actuating rod 308. When the exit ejector 29 goes foreward, its reset push rod 176, at a certain point of its first half cycle, pushes the rod 308 that actuates the main rod 306 actuating, so, the rod 307 to push the indicator support 273. The spring 309 takes the rod 306 back to its original position when the exit ejector 29 goes back to its original position. We can see on this figure an indicator stick 275 in its channel 300 before the indicator support 273 be reset. It should be noted that in this position the switch closer stick 298 (not seen) cannot close switches for mixed drinks. For specific cases the indicator stick 275 will close the switches. The stick 275 is still outside its support 273 even if the support 273 is reset but is not in its channel to actuate other switches. The stick 275 will be pushed in its support 273 by the board 301 later in the process and as described in the above paragraph. When everything is reset, the system is ready to start the same cycle, i.e., to receive an order for a bottle of beer or filler, have the desired bottle served on a section of the main conveyor and information put in this section, have the bottle transported to its order console to then be served and at the same time to sense a part of the information, the remainder of which is completely taken off later.

Referring to FIGS. 30A to 30H there is shown the electrical circuitry for one console 19 having a choice among two liquors, one filler, one bottled filler and one kind of bottled beer. The push button 310 is for liquor A, the push button 311 is for liquor B, the push button 312 is for the filler C, the push button 313 is for a mix of liquor B and the filler C, the push button 314 is for a mix of liquor A and liquor B, the push button 343 is for a double quantity of liquor A and/or liquor B, the push button 316 is for a bottle of filler D, the push button 317 is for a bottle of beer E and the push button 460 is for a mix of liquor A and liquor B and a bottle of filler D. Each of these push buttons activates a specific relay that closes and opens circuits to fulfill the purpose of the push button.

The push button 310 is to activate its relay 318 if the circuit between OP, shown on FIG. 30I and described later, is closed. When energized, the relay 318 closes its switches 319, 320 and 321. The switch 319 is in parallel with the push button 310 and circuit OP which are in series so that a quick or slow circuit closing by the push button 310 causes the relay 318 to be energized because of the closing of the switch 319. It should be noted that every relay connected to a push button has a switch like switch 319 to keep the relay energized as soon as the corresponding push button is quickly or slowly pushed on. The switch 320 is to energize the relay 322 to close the switches 323 and 324 described later. Each relay for the liquors, fillers and other ingredients of the mixing station has a switch 320; they are connected in parallel so that as soon as one of these relays is energized, the relay 322 is energized too. The switch 321 for each liquor, filler and other ingredient of the mixing station closes a part of the circuit relay of the respective dispensing valve coils 325 or respective dispensing actuating system. The switch 323 of relay 322 is to close a part of the circuit of the main conveyor motor 526. This switch 323 is in parallel to the corresponding switches of the relays for the bottles of ingredient, which are also in parallel, so that as soon as at least one of these switches is closed, this part of the main conveyor motor circuit is closed. The other part of the main conveyor circuit comprises normaly closed switches 326 in series, one for each ejector motor relay 340. Then, as soon as a main relay 318 is energized because a push button has been pushed on, unless an ejector is working, the main conveyor motor 326 starts running because of a switch 323 and runs until a switch 326 is opened. When an ejector is working the main conveyor is stopped because each ejector motor is related to a relay 340 that opens its switch 326 when an ejector motor runs. During its running time in the case of an order for an ingredient of a mixing station 26, three switches are temporarily closed by a switch closer stick 298 of a main conveyor section 270 before a switch 326 is opened. These switches are 327, 328 and 329 respectively. They are on the left of the corresponding mixing station 26 under the rear part of the main conveyor support frame 265. The switch 330 is normally closed by the front stationary glass of the exit ejector so that if there is no glass available at this position, the order will not be served. When the switch 327 is closed, providing that the switch 330 is closed, the relay 331 is energized closing the switches 332, 333, 334 and 335 and opening the switch 336. This switch 327 does not activate the bottle dispensing station 24 but is related to an exit ejector and mixing station 26. There are one switch 327, one 328 and one 329 and a relay 331 for each station 26. The switch 332 is to keep the relay 331 energized. The switch 333 is to actuate through the switch 321, and 337 for the liquors, the dispensing actuating systems for the mixing station ingredients. It should be noted that as many coils 325 and actuating systems are actuated as there are switches 321 closed. The actuating systems for ice, cherry type, etc... machines are connected like the coils 325. We can notice that the coils 325 for the liquors are not on the same circuit than the other, this is so as to permit dispensing of a double quantity of the liquor(s) as will be seen later. The switch 334 is to provide current to the relay 339 through the switch 328 and 338. The relay 339 cannot be energized through the switch 328 unless the switch 327 is closed first to energize relay 331 to close the switch 334, this to prevent having insufficient time for dispensing actuating systems to serve their predetermined quantity of ingredient. In this way only one stick 298 can close the three switches 327, 328 and 329 in order so that for a constant speed of the main conveyor 25, the three switches will always be closed in a time equal to or longer than a certain minmum lapse of time. The switch 336 is in parallel motor 353, i.e., to stop the ejector 29 itself, and the switch 351 to avoid an reenergization of the relay 340A, and close the switch 326 to have the main conveyor motor 326 electrical circuit ready for an other order. The motor 526 stays stopped if no other order has been placed In resume, the switch 329 is to have the order served and the electrical system reset. The above described cycle happens for a single ingredient drink (ordered for example by pushing one of the push button 310, 311 or 312), and for a mix of the ingredients available at mixing station 26 (ordered by pushing one of the push buttons 313 or 314). Only one order at a time can be ordered from a mixing station 26 but many push buttons can be pushed for one order. For example an order composed of a double quantity of gin with a single quantity of mixer and some ice can be ordered by pushing on, preferably at the same time to avoid error because of the speed of the machine the push button "Gin," the push button "Double," the push button "Mixer" and the push button "Ice." A system to record orders as the one for orders for bottles and bottles associated with a mix can be installed; these electrical systems are described later in this text. A tremendous number of mixes can be composed by simultaneous the pushing of buttons on the console. As shown by the circuit (push buttons 313 and 314) complex mixes can be obtained by pushing on one push button energizing a relay or relays closing switches to actuate many different volume and same volume dispensing valves and many dispensing systems for other ingredients when the switch 327 is closed, thus composing a mixed drink for which a recipe is predetermined in the machine. This is the case for all the mixed drink push buttons at the top of the order console 19 of FIG. 3.

As soon as a push button is pushed on, the corresponding light 365, that is in the push button, goes on to indicate that this order has been ordered and will go off when the order is served to indicate which order is served. The order can be a bottle of something, a glass of something or a bottle of something associated with a glass of something as seen before. In the case of a mixed drink with a predetermined recipe all the lights of the ingredients in the mix will come on when the button is pushed on. The capacitors 366A, 366B and the others are charged every time the corresponding coils 325 are energized to provide a pulse in the corresponding counter 360. The diodes in series with the counters are to take only one part of the signal from the capacitors 366. However the capacitors 567 for the mixes are connected to the corresponding relay 318. A counter registers the drinks of the same price. For example the counter 360A records pulses from the capacitor 366A and 366B that are connected to the coils of dispensing valves for dispensing the same value of different liquors while the counter 360 records pulses from the capacitor 366 connected to other coils of a dispensing valve for dispensing another value of ingredient. A counter for each kind of ingredient can easily be installed but would be more expensive. It should be noted that when a mix is ordered the corresponding switches 367 are opened to prevent to the switch 350A. The switch 350A is opened temporairly by the exit ejector. 29, more specifically by the braces 175, at the end of the exit ejector 29 cycle to reset the relays 318 for the ingredients served by the mixing station 26 when the order is served. This switch 350A is opened every time an exit ejector 29 serves an order which can be a bottle of something coming from the station 24 or a glass of something coming from the mixing station 26. When an order for a glass of something is presented to the machine 10 and, before it is served, a bottle of something is served, the switch 350A will be opened when the exit ejector 29 comes back after having served the bottle but the relays 318 of the order for the glass of something will not be reset because of the switch 336 which is normally closed unless a glass of something is served It should be noted that the switches related to the stations 24 or 26 for the exit ejector 29 are not actuated by the same part of the main conveyor section 270. Those for a glass of something, i.e., from station 26 are actuated by a switch closer stick 298, and those for a bottle of something, i.e., from station 24, are actuated by the corresponding indicator stick 275. In resume, when the switch 327 is closed, the order with single quantities of liquor is served in the ejector funnel 86 of the mixing station 26. After the switch 327 has been closed, the switch 328 is closed to energize the relay 339 if the switch 338 is closed. This switch 338 will be closed if the push button 343 for a double quantity of the liquor has been pushed on at the order time to energize the relay 342, which is kept energized by the switch 341. If the switch 338 is closed, the relay 339 will be energized when the switch 328 is closed by the stick 298. When energized, the relay 339 opens its switch 337 to reset the liquor dispensing valve(s) 81. The switch 328 is closed just long enough to reset completly the liquor dispensing valve(s) 81. When the switch 328 reopens, the relay 339 deenergizes and the switch 337 recloses to actuate again the dispensing valve(s) 81 by means of the coils 325 so that a second quantity of liquor is dispensed in the funnel 86. In resume the switch 328 is to serve a double quantity of liquor when it is ordered.

Following this is the closing of the switch 329 which energizes the relay 340A if the switch 335 is closed. The switch 335 will be closed if an order for a glass of something is about to be served but otherwise will be opened, so that even if the switch 329 is closed the relay 340A will not be energized. Let us say that the switch 335 is closed, the relay 340A opens its switch 326 to stop the main conveyor motor 326, and closes its switch 351 to keep the relay energized and its switch 352 to have the exit ejector motor 353 of this mixing station 26 run to push the exit ejector 29 to serve the glass as it has been explained before. At the end of its cycle, the exit ejector 29 opens the switch 350A to reset the mixing station 26 electrical system in the case of a glass of something order, and at the same time the switch 350B to reset the exit ejector motor relay 340A to open the switch 352 to stop the ejector the components of the mix from being recorded at their specific counter and at the corresponding mix counter 368 at the same time. The lights 370 are to indicate that the corresponding storage is about to be completely empty. These lights 370 go on when the corresponding switch 371 is closed by a float or an other empty indicating system described before. As soon as a switch 371 is closed no other order of this ingredient is recorded by the machine, as we will see in the next paragraph. The order of this ingredient already ordered, if there is one, is served because the empty indicating systems are arranged so at least some extra quantities are still in the storage. A coin-operating system can be installed in the circuitry for machines handled directly by customers. It is thus possible to connect the circuitry directly to a cash or to have to put money in the machine in order to have the machine to record the order. It would be also pretty simple to install a card reader to put the orders in the machine by mean of punched cards.

Figure 30A:
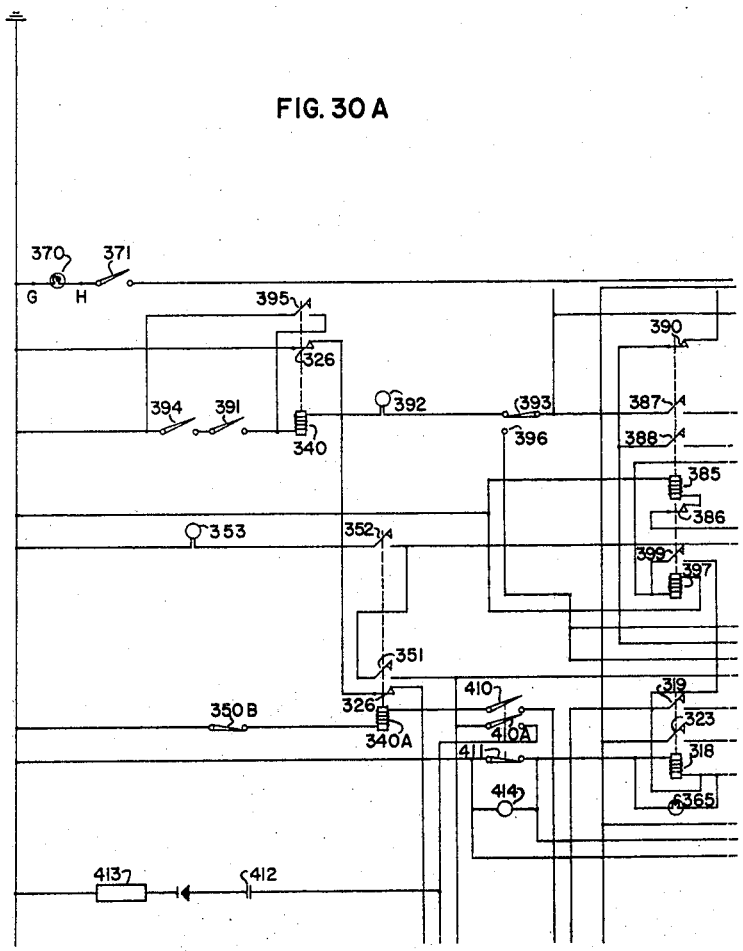
Figure 30B:
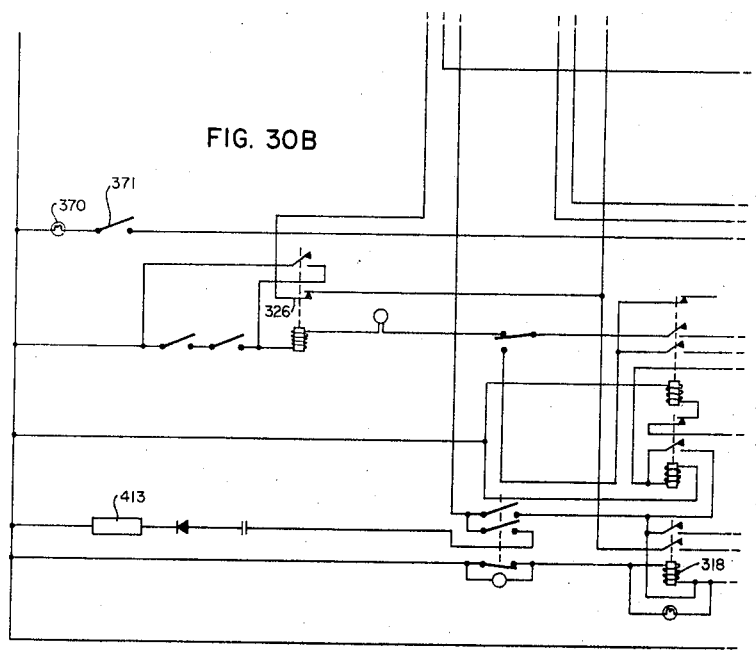
Figure 30:
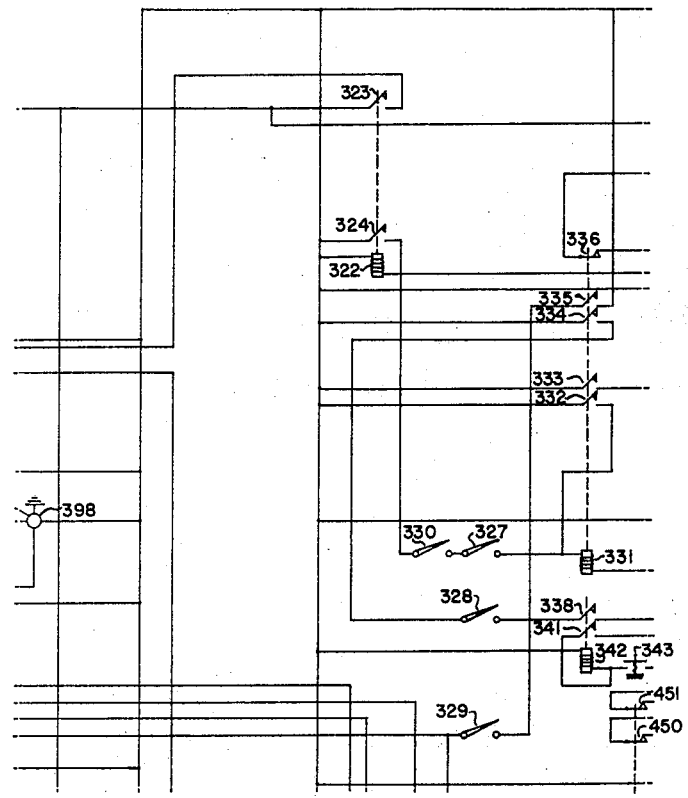
Figure 30:
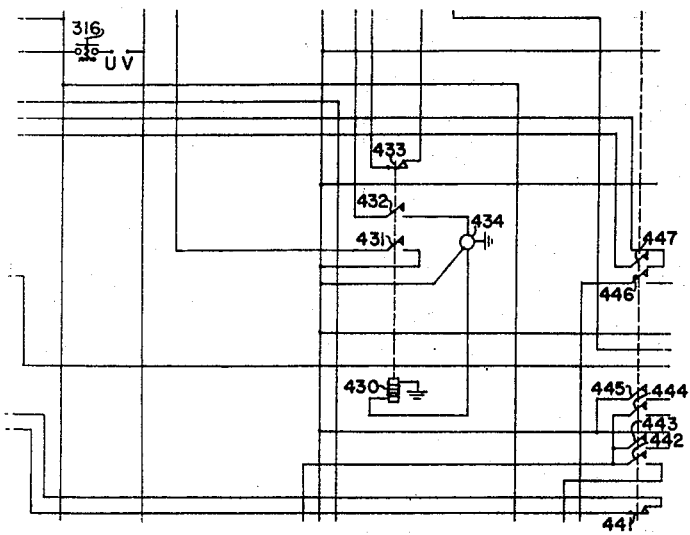
Figure 30E:
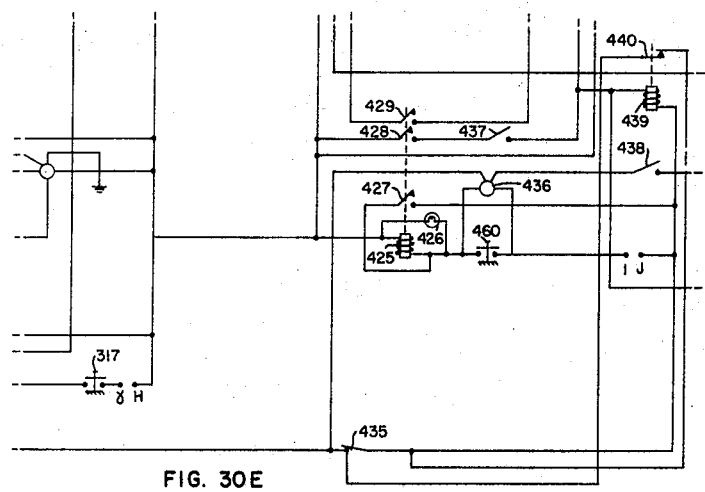
Figure 30G:
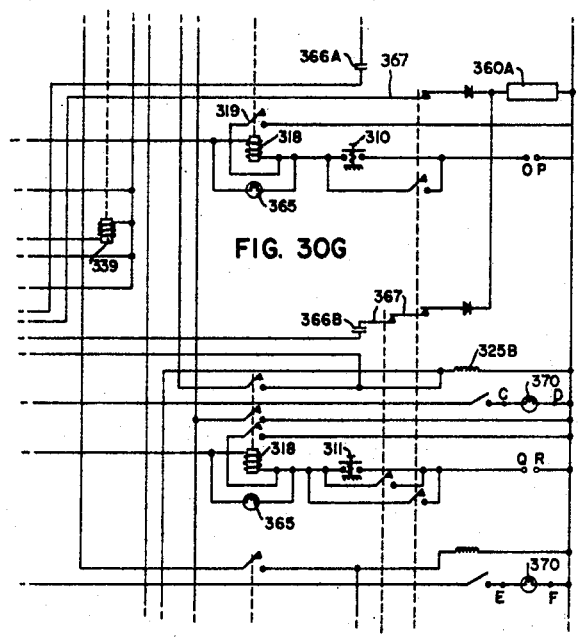
Figure 30H:
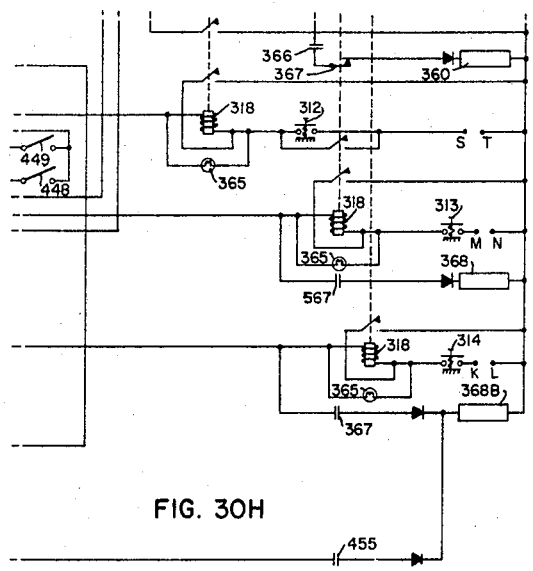
Figure 30I:
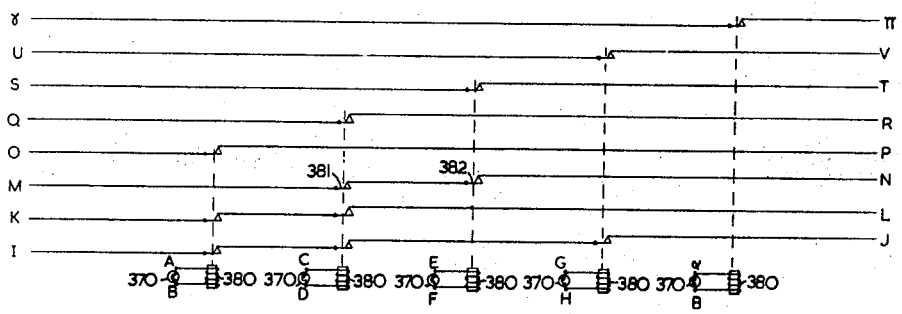

FIG. 30I shows the circuitry between the lettered points of the main circuitry. We can note that a relay 380 is connected in parallel to each empty indicating light 370 to be energized as soon as a storage is about to be empty. Each relay 380 has one switch in series in the circuit of each push button for the drinks having the ingredient represented by the empty indicating light 370. So, a single order of this ingredient is not recorded by the machine either a mix containing this ingredient cannot be ordered. This non-recording can be seen by the fact that the light 365 in the push button will not come on when the push button is pushed on. For example, the circuit MN for the push button 313 (FIG. 30h) contains two switches, 381 and 382 of two different relays 380. The push button 313 is for a mix of liquor A and liquor B. The switch 381 is one of the relay 380 connected in CD in parallel with the liquor B empty endicating light 370 and the switch 382 is one of an other relay 380 connected in EF in parallel with the liquor A empty indicating light 370. The switches 381 and 382 are in series so that as soon as at least one of them is opened, the circuit MN is opened and the relay 318 of the push button 313 cannot be energized. Then, as soon as one ingredient of a mix is missing, the mix ordered is not recorded. There is a relay 380 for each basic ingredient having one switch in the circuit of each push button as mentionned before.

To see what happens if a bottle of something is ordered, let us come back to the main circuitry. The push buttons 316 and 317 are to order bottles of different ingredients, the push button 316 being for a bottle of filler for instance, and 317 for a bottle of beer. The electrical system for both buttons 316 and 317 work the same way. When the push button 316 is pushed on, its corresponding relay 318 is energized closing its switches 319 and 323 and putting its light 365 on. The switch 319 being closed keeps the relay 318 energized and the stepping switch 398 being turned automaticly to 1 when the push button 316 is pushed on energizes the corresponding relay 385 through the switch 386 that is normally closed. When energized, the relay 385 closes its switches 387 and 388 and opens its switch 390. This switch 323 of the relay 318 is in parallel with its corresponding switches 323 of other systems. As seen before, when at least one of those switches 323 is closed, the main conveyor motor 326 runs until one of the switches 391, 329 or 410 or 448 is closed temporarily by a switch closer stick 298 or an indicator stick 275. When the switch 391 is closed by a switch closer stick 298, the corresponding relay 340 is energized through the entrance ejector motor 392, the switch 393 and the switch 387. The switch 394 is normally closed by the first bottle at the entrance behind the ejector. If there is no bottle, meaning that the storage of this ingredient is about to be empty, this relay 340 cannot be energized because this switch 394 is opened; the order is then not served until some extra bottles of this drink are provided to the machine. Then, when the switch 391 is put on, this relay 340 becomes energized opening its switch 326 to stop the main conveyor motor 326, and closing its switch 395 to keep this relay 340 energized. At the same time that this relay 340 is energized, the entrance ejector motor 392 starts running actuating this entrance ejector 255 to push a bottle on the specific section 270 of the main conveyor 25 in front of this entrance ejector 255 giving this section 270 information about the kind of ingredient in the bottle by pushing a specific indicator stick 275 and the support 273 so that this section 270 switch closer stick 298 will not close another switch on its way to destination. It will stop at destination by mean of the pushed indicator stick 275. When the ejector comes back, it opens the switch 393 to position 396. When the switch 393 is opened, the corresponding relay 340 resets, opening its switch 395 to keep it reset and stop this entrance ejector motor 392, and closing its switch 326 to have the main conveyor motor 326 start again. When the switch 393 is in position 396, the corresponding relay 397 is energized through the switches 387, 396 itself, 433, 388 and the counter stepping switch 398 if at number one. When the counter stepping switch 398 is at an other number than one, the circuit to the relay 397 is opened avoiding its energization but the stepping switch 398 will decrease by one number every time a bottle is served on a different section 270 to get at one at the last one. At one, the circuit is closed permitting the energization of this relay 397. This stepping switch 398 is on the console 19 combined with the order push button 316 for example, and is set to the number of bottles by the number of pushes on the push button. If the stepping switch 398 is at an other number than one, the electrical cycle to serve a bottle on a main conveyor section 270 will repeat with a different main conveyor section 270 each time until the stepping switch 398 is at one. When the stepping switch 398 is at one, the corresponding relay 397 is energized through the circuit described before, opening its switch 386 and closing its switch 399. The switch 386 is opened to keep the relay 385 reset opening so the switches 385 and 387 and closing the switch 390 to permit orders of the same ingredient from other consoles 19 to be served on the main conveyor. The electrical circuitry on FIG. 30J will describe it. The switch 386 is opened to keep this relay 385 denergized until the last bottle of the order is served on its order console counter 18. Then, when the stepping switch 398 is at zero and the last bottle of the order is served, all the bottles of this order are on the main conveyor 25 and are conveyed by it to there order console 19. Just before it is in front of the order console 19 the switch 410 and 410A are closed and the switch 411 is opened simultaneously by the specific indicator stick 275. It should be noted that the switch closer stick 298 cannot close the switches 327, 328 and 329 to serve a glass of something if one is ordered, because the support 273 which the stick 298 is fixed as it has been pushed at the entrance of the bottle on that section 270 of the main conveyor 25. When the switch 410 is closed, the relay 340A is energized and the same thing happened than when the switch 329 is closed in the case where a glass of mixed drink is served, that is described before. The only difference is that when the switch 410A is closed the capacitor 412 is charged to activate the corresponding counter 413. There is one counter 413 for each console 19 to record the number of bottles of filler and one counter 413 to record the number of bottles of beer that are served at each console 19. The stepping switch 414 is an opened circuit when at number zero and is a closed circuit, with a certain resistance, when at other numbers. The resistance is high enough to provide voltage to actuate the stepping switch 414 but not too high to take off enough voltage to reset the relay 318. The stepping switch 414 is mechanically dependant on the stepping switch 398 when turned clockwise but independant to turn counter-clockwise. When the stepping switch 414 is at another number than zero, the relay 318 stays energized until the last bottle of the order is served; at that time, the stepping switch 414 is at zero and the corresponding relay 318 resets when the switch 411 opens. When this relay 318 resets, it opens its switch 319 to reset completly this part of the system by resetting the relay 397 opening the switch 399 and closing the switch 386 to have the circuit of the relay 385 ready for an other order of this ingredient from this console 18, and this same relay 318 opens its switch 323 that has been used to have the main conveyor motor 326 run for this order. The push button 316 is ready for an order only if the two stepping switches 398 and 414 are at zero.

Figure 30J:
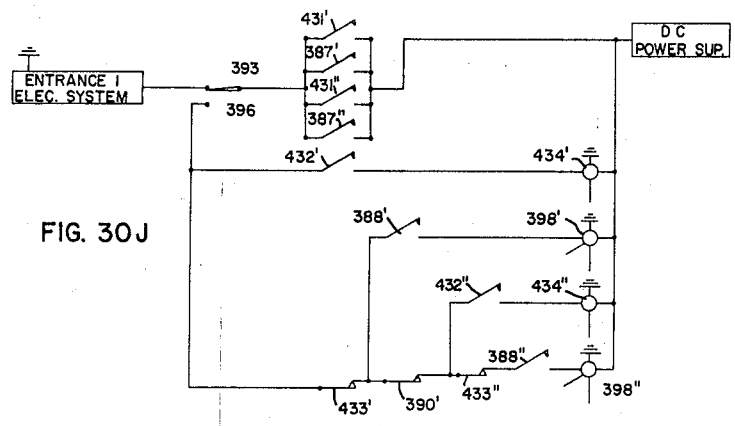

FIG. 30J shows the circuitry of specific corresponding switches in different consoles 19. All the switches 387 and 431 are connected in parallel but actuated by different relays so that as soon as one of them is closed, that is when at least one order for a bottle of this ingredient is ordered at an order console 19, this entrance electrical system works when the switch 391 (FIG. 30A) is closed as explained before. The entrance system is independent of where the order originates: it works until all the switches 387 and 431 are opened, that is until all the orders of the order consoles 19 are served on the main conveyor 25. The switches 387, 388 and 390 are actuated by their relay 385 and the switches 431, 432 and 433 by their relay 430 at each console 19. They operate concurrently, i.e., if the switch 387 or 431 is closed, the switch 388 or 432 is closed and the switch 390 or 433 is opened and if the switch 387 or 431 is opened, the switch 388 or 432 is opened and the switch 390 or 433 is closed. When an order is called through the counter 434', the switch 433' opens, preventing the other counters 398', 434' and 498' from decreasing by one when the switch 393 is at position 396. The same thing happens to the counters 434'' and 398'' when an order is served for the counter 398' because the switch 390' is opened and the switch 433' is closed as a result of the order for the counter 434' being completely served onto the main conveyor 25. When the switch 433' is closed, the counter 398' is actuated through the switches 387', 393 (at position 396), 433' and 388' and so on for the counters 434'' and 398''. The orders are served in rotation, the first one at the left of the bar being served first, this being controlled by the switches 390 and 433. The switches 431, 433 and 432 are used when a mix with a bottle of something is ordered, this will be described later. Prime (') indicates the first console 19 and double prime ('') indicates second order console 19. An order for a mix and a bottle has priority over and order for a single bottle at a specific console 19. If an order for a single bottle is served on the main conveyor 25 for the second console and before to be at destination an order for the same thing is ordered at the first console 19, some or all the bottles served on the main conveyor 25 for the console No 2 will stop at console No 1, the number depending on the order of console No 1; but the order of console No 1 will be served on the main conveyor 25 to be served later to the console No 2. The right number of bottles will thus be served at each place but not in the order requested. A new order for the same kind of bottled ingredient can be called only after the previous order is completely served on its counter 18 as seen before; this gives enough time for all the consoles 19 to be provided with their complete order. A control system can be added to give priority to specific consoles 19, but the fact that the choice of kinds of beer and filler is big and that the machine is fast to serve prevents in the majority of the cases the necessity of such a system.

The last possibility of an order is a glass of mixed beverages with a bottle of filler, for example, a mix of liquor A and liquor B with a bottle of mixer D. To describe it, let us go back to FIG. 30e. Such an order is placed by pushing the push button 460 actuating the stepping switches 434 and 436 energizing the relays 430 and 425 respectively. The stepping switches will record the number of times the push button 360 is pushed on, and have the orders served consequently. When the relay 425 is energized, it closes its switches 427, 428 and 429. The switch 427 is to keep the relay 425 energized. The switch 428 is to energize the relay 439 and the switch 429 is in parallel with the switches 323 and serves the same purpose which is to cause the main conveyor motor 326 to run. The relay 430, when energized, closes its switches 431 and 432 and opens its switch 433. When at another number than zero, the stepping switch 434 keeps the relay 430 energized until it is at zero. The switch 431 is to provide current to the entrance system. The switch 432 serves to actuate the stepping switch 434 and the switch 433 being opened prevents the signal caused by this order from being taken by an other stepping switch. This switch 433 gives the priority to this type of order over orders of a single bottle of this ingredient. In other words the stepping switch 434 will decrease to zero before the other stepping switch for the same bottle of ingredient, i.e., the stepping switch 398. This can be easily seen on FIG. 30J. When the switch 433' (FIG. 30J) is opened, the order is recorded by the stepping switch 434', the switch 432' being closed instead of by the stepping switch 398', i.e., the other stepping switch for a single order of the same bottle of ingredient of the first order console 19. The same sequence occurs for each console 19; for example when the switch 433'' is opened, the bottle served is recorded by the stepping switch 434'' instead of by the stepping switch 398''. The same description than for the push button 316 described before applies here to have a bottle of a specific ingredient pushed on the section 270 and to give the section 270 information about the kind of ingredient in the bottle in pushing an indicator stick 275 that will move in a specific channel 300 to close switches when the bottle is conveyed to destination. Before it is in front of its commanding exit ejector and mixing station 26, the switches 437, 438, 448 and 449 (the two latter simultaneously) are closed temporarily in order by the indicator stick 275 (the first one of the same kind of bottle of ingredient) to energize the relay 439 through the switch 428 which is closed when the relay 425 is energized, have the stepping switch 436 decreased by one through the switch 446 and have the exit ejector push the order on the order console 19 because of the switches 448 and 445. When the relay 439 is energized, it opens its switches 440, 441, 450 and 451 and closes its switches 442, 443, 444, 445, 446 and 447. The switch 440 is in parallel with the switch 435 so that, to open this circuit, both have to be opened. The switch 441 is in series with the exit ejector electrical system of the push button 316 that, when opened, makes this latter push button system independant of the present order. The switches 450 and 451 are to prevent recording on the counters 360A. The switch 442 is in parallel with the in series switches 428 and 437 to keep the relay 439 energized. The switch 443, when closed, is to energize the dispensing valve coil 325B for the liquor B while the switch 444 is to energize the dispensing valve coil 325A for the liquor A. The switch 445 is to actuate the exit ejector system as described for the push button 316 when the switch 329 is closed but here when the switch 448 is closed by the indicator stick 275. The switch 446 is for the stepping switch 436 as described before. The switch 447 is to prevent recording of the dispensing of this bottle by the stepping switch 414 that is for a single bottle order. It should be noted that the switches 410 and 411 for a single bottle order are physically situated between the switch 437 and 448 but do not affect each other, i.e., if the switch 437 is closed, the system is not affected by the switches 410 and 411, and on the other side if the switch 437 is not closed first the system is affected by the switches 410 and 411 but not by the switches 437 and 448. The switches 410 and 411 are actuated by the same level arm. When the switch 448 is closed, the relay 340A is energized opening its switch 326 stopping then the main conveyor motor 326 as described before for the closing of switches 329 or 410 and the capacitor 412 is charged when the switch 449 is closed to record the bottle in the counter 413. The liquors are recorded on the counter 368B because of the capacitor 455 that is charged when the relay 439 is energized. These types of order are recorded part by part to simplify the control with the counters. During the period between the closing of the switch 437 and the switch 448, the electro-magnetic dispensing valves dispense the ingredient so that when the switch 448 is closed, the bottle and the mix are pushed on the counter 18. When the exit ejector comes back, it opens the switch 435 temporairly to reset the relays 425 and 439. The relay 425 will stay reset if the stepping switch 436 is at zero but will reenergize as soon as the switch 435 recloses if not at zero. The exit ejector will open the switch 435 every time it pushes something but will reset the relays 425 and 439 only if the relay 439 is energized to have its switch 440 opened. It could happen that a bottle of the same ingredient ordered before has its corresponding indicator stick 275 between or on the switches 437 and 448 when an order for this same ingredient with a glass of mixed beverages is made; in this case, the bottle is served normally without taking care of the new order because, even if the switches 437 and 448 are closed without having the switch 437 closed first, the switches 445 and 446 are opened to open their respective circuits, thus cancelling the effect of the switches 438, 448 and 449.

It is understood that the foregoing is a description of one embodiment of invention only, and that modifications thereof will be obvious to one skilled in the art, without departing from the scope and spirit of the invention, which is as described in the appended claims.

What is claimed is:

1. An automatic drink dispensing machine comprising:
   a. a plurality of bottle storage areas;
   b. glass storage means;
   c. a plurality of liquid storage means;
   d. an exit station;
   e. glass conveyor means for delivering a drinking glass from said glass storage means to said exit station;
   f. glass filling means for filling said drinking glass with a measured amount of liquid taken from a selected one of said liquid storage means;
   g. bottle supply means comprising:
      i. a conveyor, having a moveable portion which is adapted to move from a position adjacent to a bottle storage area to a position adjacent said exit station;
      ii. means for placing a bottle from a selected one of said bottle storage areas on said moveable portion when said moveable portion is proximate to said bottle storage area;
      iii. a plurality of indicator means, each shiftable from a first position to a second position, said indicator means being associated with and moveable with said moveable portion;
      iv. means for shifting selected said indicator means from said first position to said second position when a bottle from a particular bottle storage area is placed on said portion;
      v. means for sensing the position of said selected indicator means when the moveable portion is remote from said bottle storage area; and
      vi. means for removing a bottle from said moveable portion at said exit station; and
   h. actuating means for actuating said glass conveyor means and for actuating at least one of said bottle supply means and said glass filling means in response to a drink selection made by an operator.

2. An automatic drink dispensing system as claimed in claim 1 including glass receiving and washing means adapted to receive dirty glasses, wash them, and discharge them into said storage means for glasses.

3. An automatic drink dispensing system as claimed in claim 1, in which said washing means comprises:
   a washing area
   a rinsing area, and
   a drying area
   a conveyor belt including glass retaining means passing through said washing rinsing and drying areas in succession,
   means for supplying a washing liquid to said washing area, and evacuating used liquid therefrom,
   means for supplying a rinsing liquid to said rinsing area and evacuating used liquid therefrom, and
   means for supplying air under slight pressure to said drying area.

* * * * *